(12) United States Patent
Hermreck et al.

(10) Patent No.: US 8,429,024 B1
(45) Date of Patent: Apr. 23, 2013

(54) SYSTEM AND METHOD FOR TRACKING CHARITABLE DEDUCTIONS

(75) Inventors: Scott A. Hermreck, Omaha, NE (US); Craig B. Walter, Papillion, NE (US); Gordon D. Whitten, Jr., Waterloo, NE (US); Carey G. Rademacher, Omaha, NE (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/475,812

(22) Filed: May 18, 2012

Related U.S. Application Data

(60) Division of application No. 12/127,622, filed on May 27, 2008, now Pat. No. 8,200,553, which is a continuation of application No. 09/805,321, filed on Mar. 13, 2001, now Pat. No. 7,395,230.

(51) Int. Cl.
*G06Q 30/00* (2006.01)
(52) U.S. Cl.
USPC .............................. 705/26.3; 705/30; 705/31
(58) Field of Classification Search ........................ None
See application file for complete search history.

(56) References Cited

U.S. PATENT DOCUMENTS

| | | |
|---|---|---|
| 5,006,998 A | 4/1991 | Yasunobu et al. |
| 5,212,639 A | 5/1993 | Sampson et al. |
| 5,226,111 A | 7/1993 | Black et al. |
| 5,649,117 A | 7/1997 | Landry |
| 5,772,251 A | 6/1998 | Fleck |
| 5,819,249 A | 10/1998 | Dohanich et al. |
| 5,857,174 A | 1/1999 | Dugan |
| 5,884,285 A | 3/1999 | Atkins |
| 5,909,794 A | 6/1999 | Molbak et al. |
| 5,911,131 A | 6/1999 | Vig |
| 5,987,231 A | 11/1999 | Fong et al. |
| H1830 H | 1/2000 | Petrimoulx et al. |
| 6,064,983 A | 5/2000 | Koehler |
| 6,125,356 A | 9/2000 | Brockman et al. |
| 6,202,052 B1 | 3/2001 | Miller |
| 6,272,473 B1 | 8/2001 | Sandholm |
| 6,304,853 B1 | 10/2001 | Malnekoff |
| 6,519,573 B1 | 2/2003 | Shade et al. |

(Continued)

OTHER PUBLICATIONS

Tax Year 1997, User's Guide for TurboTax: Guides you through your tax return step by step, for Windows, Quicken Financial Solutions, Intuit Inc., Oct. 1997, 61 pages.

(Continued)

*Primary Examiner* — F. Zeender
*Assistant Examiner* — Christopher Buchanan
(74) *Attorney, Agent, or Firm* — Osha Liang LLP

(57) ABSTRACT

A system and method for recording and tracking charitable donations over a period of one or more years, and for determining the tax consequence associated with such donations based upon taxing authority guidelines applicable to the time period in which such donations were made. Additionally, a method implemented by software for tracking charitable donations over a period of years whereby a user is prompted to select a donation and a year in which the donation was made for a memory. The software retrieves a tax deduction valuation associated with that donation and stores the donation and value in the memory in association with each other. Another aspect is directed to a system for determining the tax deduction value of charitable donations whereby a partner server electronically captures sales data of items and sends the sales data to a system server that stores such data in memory.

9 Claims, 22 Drawing Sheets

U.S. PATENT DOCUMENTS

| | | |
|---|---|---|
| 6,542,875 B1 | 4/2003 | Mulvihill et al. |
| 6,898,575 B2 | 5/2005 | Mull |
| 7,203,661 B1 | 4/2007 | Graff |
| 7,236,943 B1 | 6/2007 | Heflin |
| 7,426,489 B2 | 9/2008 | van Soestbergen et al. |
| 7,461,022 B1 | 12/2008 | Churchill et al. |
| 7,797,192 B2 * | 9/2010 | Mitchell et al. .................. 705/16 |
| 2001/0032116 A1 | 10/2001 | Hyatt |
| 2001/0034695 A1 | 10/2001 | Wilkinson |
| 2002/0002524 A1 | 1/2002 | Kossovsky et al. |
| 2002/0038225 A1 | 3/2002 | Klasky et al. |
| 2002/0077942 A1 | 6/2002 | Wilkinson |
| 2002/0111888 A1 | 8/2002 | Stanley et al. |
| 2002/0116290 A1 | 8/2002 | Hodges |
| 2002/0120539 A1 | 8/2002 | Price |
| 2004/0039649 A1 | 2/2004 | Mull |
| 2008/0010365 A1 * | 1/2008 | Schneider ..................... 709/223 |
| 2008/0015980 A1 * | 1/2008 | Pereira et al. ................... 705/39 |
| 2010/0100491 A1 * | 4/2010 | Frank et al. ................... 705/310 |

OTHER PUBLICATIONS

Thomas, K. C., Wathc Credit Cards Vows, Tax Write-Offs: [City Edition], Richmond Times, Richmond, Virginia, U.S.A., Dec. 14, 1997, 4 pages.

CA$H—For Your Used Clothing, 1999 Edition—Online System User Guide, Cash User Guide, 12 pages.

CA$H for Your Used Clothing, Eleventh Edition, 2000, 33 pages.

\* cited by examiner

Browse Items

This screen allows the user to browse items within each category and/or sub-category and/or search items for certain data Enter Optional Search Word — 230
Search — 232

Select Category — 252
Select Sub-Category — 254
<All Sub-Categories>

Boys Clothing
Boys Clothing
Computer Components
Custom Items
Girls Clothing
Household Goods
Infants Clothing
Mens Clothing
Mens Premium Clothing

248 —

Deduction: Savings:
$14.00    $4.76

Browse All

| Description | Value in Good Condition | Value in Fair Condition | Value in Poor Condition |
|---|---|---|---|
| Belts | | | |
| Dress, Leather | $8.00 | $6.00 | $1.00 |
| Other | $6.00 | $4.00 | $1.00 |
| Caps | | | |
| Baseball | $3.00 | $2.00 | $0.50 |
| Stocking | $2.00 | $1.00 | $0.50 |
| Sun Visor | $2.00 | $1.00 | $0.50 |
| Scarves | | | |
| Dress | $3.00 | $1.00 | $0.50 |
| Winter | $2.00 | $2.00 | $0.50 |
| Suspenders | | | |
| Button-on, Clip-on | $4.00 | $3.00 | $1.00 |
| Ties | $2.00 | $2.00 | $1.00 |
| Exercise | | | |
| Jackets | | | |

Print Preview

Year-to-Date Non-Cash Donations

ItsDeductible

Prepared By:

Jane Doe
1234 Main St.
Anytown, NA 12345

XYZ Charity 456 Any Street Anytown US 98765

Gift Date: 12/01/2000

Donated Items
Boys Clothing - Accessories - Belts - Dress, Leather
Boys Clothing - Accessories - Caps - Baseball
Boys Clothing - Accessories - Caps - Stocking
Boys Clothing - Accessories - Scarves - Dress

| Condition | # Items | Value | Total |
|---|---|---|---|
| Good | 1 | $8.00 | $8.00 |
| Fair | 1 | $2.00 | $2.00 |
| Fair | 2 | $1.00 | $2.00 |
| Good | 1 | $2.00 | $2.00 |
| Sub-Total Gift Date | | | $14.00 |
| Sub-Total Charity | | | $14.00 |
| Grand Total Item Donations | | | $14.00 |

Select Printer...   Print   Cancel   <<Page 1 of 1   Page 1 of 1>>

SYSTEM AND METHOD FOR TRACKING CHARITABLE DEDUCTIONS

STATEMENT REGARDING FEDERALLY SPONSORED RESEARCH OR DEVELOPMENT

Not Applicable.

CROSS-REFERENCE TO RELATED APPLICATIONS

The present application claims priority under 35 U.S.C. §120 from and is a divisional of U.S. patent application Ser. No. 12/127,622 filed May 27, 2008, and entitled "SYSTEM AND METHOD FOR TRACKING CHARITABLE DEDUCTIONS." U.S. patent application Ser. No. 12/127,622 claims priority under 35 U.S.C. §120 from and is a continuation of U.S. Pat. No. 7,395,230 filed Mar. 13, 2001, entitled "SYSTEM AND METHOD FOR TRACKING CHARITABLE DEDUCTIONS," with the same inventors.

FIELD OF THE INVENTION

This invention relates generally to the field of systems and software for assisting in tax preparation. More particularly, this invention relates to a system and method implemented by software for recording and tracking charitable donations over a period of one or more years, and for determining the tax consequence associated with such donations based upon taxing authority guidelines (including laws, regulations, rules, guidelines or other mandates) applicable to the time period in which such donations were made.

BACKGROUND OF INVENTION

Taxpayers typically are entitled to a tax deduction for charitable donations made throughout the tax year. A taxpayer usually will keep receipts or records of donations made to various charitable organizations to aid in estimating the amount of any deduction which may be taken upon the filing of a tax return.

Currently, during the preparation of an income tax return, a taxpayer gathers the receipts or records of the charitable donations made throughout the year and estimates how much an item is worth depending on its condition when donated. It is very difficult for most taxpayers to estimate the value of a donated item, especially if the taxpayer does not have access to a resource that estimates the value of such items. The taxpayer typically underestimates the value of the items which have been donated, thus underestimating the amount of the charitable deduction that can be claimed.

In addition, taxpayers have less incentive for making charitable donations because they do not realize the potential tax savings in making such a donation. Some taxpayers believe that they would not get a significant amount of tax savings by donating items to a charitable organization. Therefore, taxpayers either donate items and do not claim a deduction in their taxes or discard items that could be given away to charity because they feel such a deduction would be insubstantial and not worth the time and effort necessary to track such donations.

Further, taxpayers oftentimes are discouraged from making charitable donations because they find it difficult to monitor and summarize receipts from such donations. When preparing a tax return, a taxpayer typically manually tallies the total monetary amount of donations made during the tax year. Taxpayers may be discouraged from donating items to charitable organizations because they do not want to get involved in this time consuming and tedious process.

Currently, taxpayers can use a book or software to determine the valuation of charitably donated items. However, these methods are only good for a current tax year, the taxpayer has no way to track the taxpayer's charitable donations over a period of multiple years. In addition, the taxpayer cannot track charitable donations until tax deductible valuations have been established for the year.

Even if the taxpayer were to use software to determine the valuation of charitably donated items, the taxpayer has to manually enter charitable donation information into a tax return. As larger numbers of people begin using tax preparation applications, they may want to have their charitable donation information directly inserted into the tax preparation application.

Accordingly, there remains a need in the bookkeeping, accounting and tax preparation fields for a system and method for providing a value to a corresponding item donated to a charitable organization, based upon a valuation methodology such as the condition of the item when donated. In addition, there remains a need for software that provides a system and method which encourages taxpayers to make charitable donations. Further, there remains a need for software that makes it easier to monitor and summarize tax deductions for charitable donations.

SUMMARY OF THE INVENTION

According to the present invention, the foregoing and other objects are achieved by a system and method which enables a user to record and track charitable donations made over a period of one or more years, and to determine the tax consequence associated with such donations based upon the taxing authority guidelines (including laws, regulations, rules, guidelines or other mandates) applicable to the time period in which such donations are made. The method is implemented by software which may be utilized on a stand-alone personal computer (PC) or via a server accessible to the user over a communications network. The user is enabled to record the charitable donations throughout the course of the year, and the system is programmed to apply any updated tax consequence information (including current tax deductible valuations and changes in taxing authority guidelines) to the donations previously recorded when such updated tax consequence information becomes available. In this manner, a user is able to record and track charitable donations throughout the course of the year and accurately determine the applicable tax consequences for use in preparing a tax return, even if the applicable tax consequences were not available at the time the donation was recorded or even if the applicable tax consequences change after the time the donations are recorded.

In a preferred embodiment, the system comprises a memory, a display and an input. The memory includes data indicative of a plurality of donations. In conjunction with each of those donations are current tax deductible valuations and at least one previous year's tax deductible valuations. Upon input of one of the donations and related donation information, the tax deductible valuation associated with the donation for the corresponding tax year is retrieved from memory. The retrieved tax deductible valuation, the input donation and donation information are associated with one another, displayed on the display and stored in memory for later use.

Preferably, the method and system allow a user to record and track charitable donations over a period of years. The memory includes separate tax deductible valuations corresponding to each year so that a donation may have a different tax deductible valuation associated with each year. The user inputs donation information including the date the donation was given. The tax deductible valuation associated with the specific donation for the tax year in which the donation was given is retrieved from memory. The donation information and the retrieved tax deductible valuation are then stored in association with each other in the memory.

The donation information preferably includes the date of the donation, specific information regarding the charity receiving the donation, and the type of donation. The types of donation can include any charitable donation acceptable under applicable taxing authority guidelines. These types of donations include non-cash item donations, monetary donations, financial securities donations, mileage donations and out-of-pocket expenses.

The software implementing the method and system of the present invention is preferably able to be updated to reflect changes in information stored in memory that could impact the tax consequences associated with the donations previously entered. In order to remain current and in compliance with current taxing authority guidelines, the memory may be updated periodically with changes in laws, regulations, rules, guidelines or other mandates that affect the user's tax planning in regards to charitable donations.

The software is also preferably updated with current tax deductible valuations for charitable donations. Current tax deductible valuations of non-cash item donations can be collected in any manner including conducting audits of used stores, but in a preferred embodiment, tax deductible valuations are electronically collected via a system server that is programmed to receive sales data from one or more partner servers. The partner servers have access to a data source where items are sold. The partner servers are programmed to capture sales data of the items sold. The sales data preferably includes an item description, date of sale and amount of sale. The sales data is periodically sent to the system server and stored in the memory of the system server.

The data sources preferably include on-line auction sites, web sites of retail stores that sell used goods, and retail stores that sell used goods. The sales data is preferably electronically captured during the actual sales transaction. The system server preferably aggregates the sales data from all partner servers and then calculates current tax deductible valuations for the items sold during that period. The current tax deductible valuations may then be input to the memory to update the valuations attributable to items donated during the period.

The user is preferably able to record and track charitable donations in a current year without having updated tax deductible valuations of the donations for the current year. The user inputs donation information including the date the donation was given. In order to give the user some idea of the tax deductible valuation, the system may be programmed to retrieve the tax deductible valuation associated with the donation for the previous tax year from memory. The donation information and the retrieved previous year's tax deductible valuation are then stored in association with each other in the memory. When the updated tax deductible valuations become available, the memory is updated with a current set of data indicative of donations and a current tax deductible valuation associated with each donation. The updating procedure preferably involves retrieving the previously stored donations and applying the current year tax deductible valuation. The donation and current year tax deductible valuation are then stored in memory associated with each other.

The system is optionally programmed to provide information to the user when inputted data meets certain criteria tied to a specific tax consequence. For instance, when a user has made non-cash item donations with a tax deductible valuation exceeding $500, the user is required to submit IRS form 8283 with the user's tax return. In addition, it is anticipated that taxing authority guidelines could require that a certain minimum amount of donations be made before a certain tax consequence would apply, or that a certain maximum amount of donations would be deductible. The system is programmed to determine if the inputted data meets any of these criteria and inform the user of the tax consequence.

Another aspect of the present invention is directed to a system and method for preparing an income tax return. Preferably, the user inputs donation information for a specific year into memory throughout the course of the year. This information may then be incorporated when preparing a return. The tax deductible valuation associated with the donation information is determined for the specific tax year. This tax deductible valuation is incorporated into the user's income tax return for the specific year.

In a preferred embodiment, the method for preparing an income tax return may include the additional steps of (1) calculating the total amount of non-cash item charitable donations for the desired tax year; (2) determining whether the total amount of non-cash item charitable donations is sufficient to require filling out IRS form 8283; and (3) importing the non-cash item charitable donation information in IRS form 8283 if required.

Various methods may be used to electronically retrieve the charitable donation information. Preferably the user selects the method of retrieving the information. Once the method has been selected, the information is imported into a tax preparation application for use in preparing the tax return.

The methods for retrieving the charitable donation information preferably include a printed electronically readable code and an electronically exportable file. The code preferably contains all the information necessary for a tax preparer to fill out the charitable donation portion of a tax return. The tax preparer can electronically read the code to electronically import this information into a tax preparation application. The printed electronically readable code is most preferably a printed bar code that is readable with the use of a bar code scanner.

The electronically exportable file is preferably formatted in accordance with the requirements of a user selected tax preparation application. If the memory containing the donation information is located on a user's PC, and the tax preparation application is located on the user's PC or is a web based application, then the tax preparation application can browse the user's PC memory to select the export file. The charitable donation information is then retrieved and used to fill out the appropriate portions of the user's tax return.

If the memory containing the donation information is located on a system server of an application service provider, and the tax preparation application is located on the user's PC or is provided by an application service provider, then the tax preparation application may allow the user to enter identifying information. The tax preparation application connects to a communications network such as the Internet and submits the identifying information to the system server. The system server will verify the information and if correct, format an export file in accordance with the requesting tax preparation application.

Objects of invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are employed to indicate like parts in the various views:

FIGS. 3-23 are exemplary illustrations of user interface displays presented during use of the software of the present invention.

DETAILED DESCRIPTION OF THE PREFERRED EMBODIMENT

Figure 1:
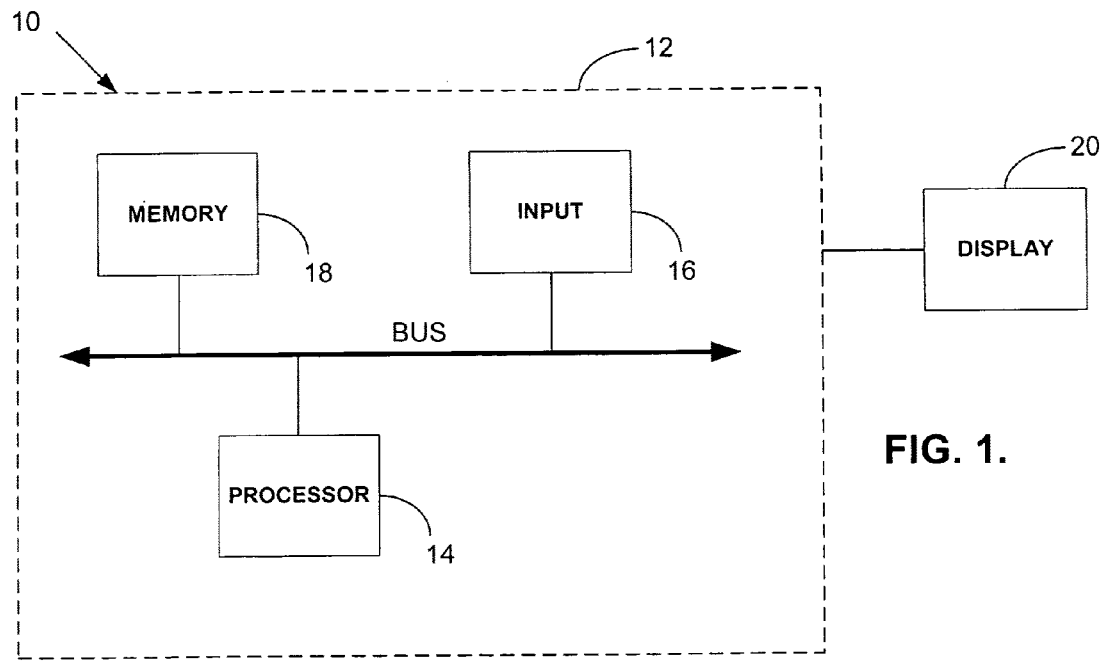
FIG. 1 is a block diagram illustrative of a computer system for use in implementing the present invention.

Referring to the drawings in greater detail, and initially to FIG. 1, in particular, a schematic of a system capable of implementing the software of the present invention is broadly designated therein by reference numeral 10. The software is embodied and used in a local computing system 12 which includes an operating medium having a processor 14, input 16, memory 18, and display 20. Input 16, memory 18, and display 20 are all connected to processor 14 in a manner known to those skilled in the art.

Figure 2:
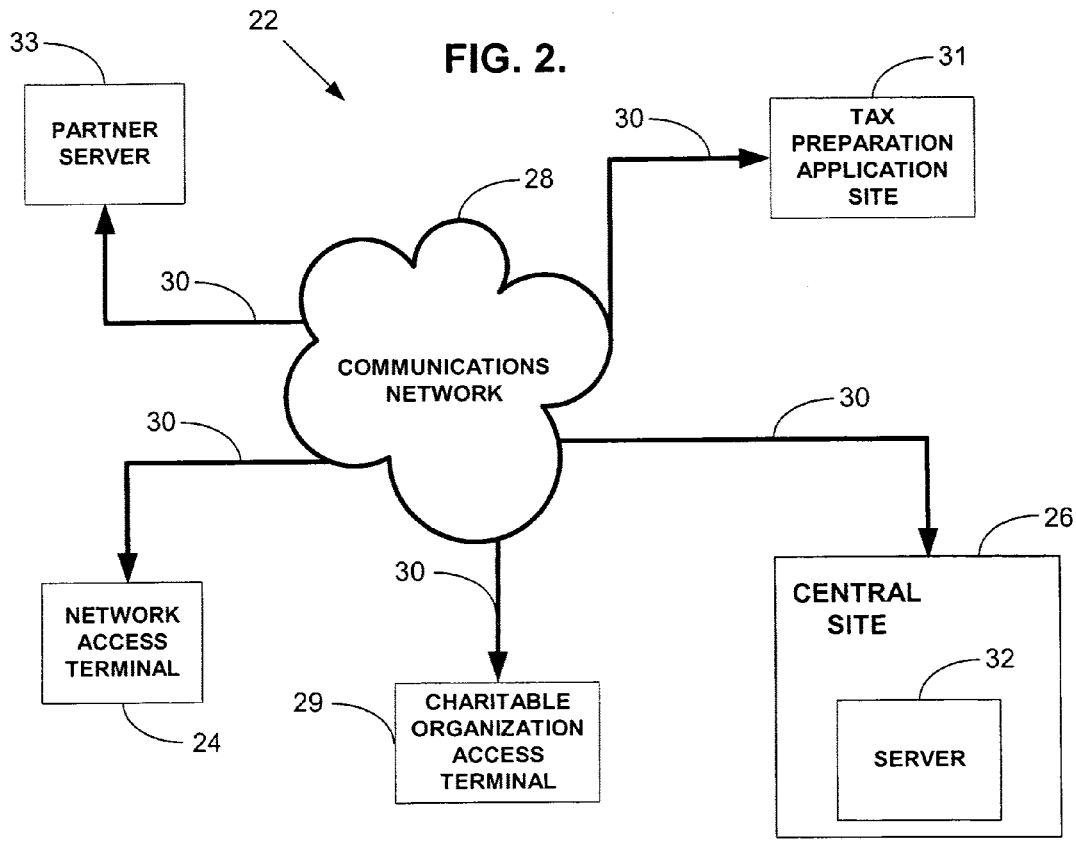
FIG. 2 is a block diagram illustrative of a alternate system implementing the present invention which includes a communication network connecting a network access terminal to a charitable organization, a tax preparation application, a partner server and a server, the server capable of accessing a central site.

As an alternative embodiment and as illustrated in FIG. 2, the present invention may be embodied in a network or web enabled environment broadly designated in the drawings by reference numeral 22. Network environment 22 includes a network access terminal 24 that accesses central site 26 via a communications network 28 and communications link 30. Access terminal 24 may be any conventional electronic device for accessing communications network 28 including a personal computer, personal digital assistant (PDA), web-enabled cell phone, interactive television or the like. Communications network 28 includes but is not limited to the Internet. Accordingly, it should be understood that communications link 30 may be wireless, cable or other wired network arrangement, or fiber optics. Central site 26 preferably has server 32 for hosting the software of the present invention and serving as an application service provider. According to this embodiment, a user accesses the software stored at central site 26 from access terminal 24 which is located at a location remote from central site 26. Access terminal 24 and/or central site 26 can also be connected to one or more access terminals 29 designated by a charitable organization via communications network 28 and communications link 30. In addition, access terminal 24 and/or central site 26 can be connected to one or more tax preparation application sites 31 and one or more partner servers 33 via communications network 28 and communications link 30.

In both embodiments described above, the software of the present invention is stored on a computer readable medium having computer-executable instructions for assisting in tax preparation. The term computer readable medium includes, but is not limited to, any kind of computer memory such as floppy disks, conventional hard disks, CD-ROMS, flash ROMS, nonvolatile ROM, and RAM.

For purposes of this description, the software includes databases used in performing operations of the system including a user information database, charitable organization database, item database, item valuation database, user donation database and application programs that perform specific processes in relation to the databases.

User information database maintains data on the user, including username, password, name, address, phone number, federal tax rate, state tax rate and donation information. Charitable organization database maintains data on charity's name, address, and phone number. Donated item database maintains data on items that may be donated including clothing, appliances, electronics, household goods, books, music, sporting equipment, furniture, linens, bathroom accessories, kitchen accessories, toys and the like. Item valuation database maintains data on the tax deductible valuations for items in the donated item database for each year. User donation database maintains data on the actual items selected by the user associated with the particular item's valuation.

With reference to FIGS. 3-23, the system and method of the present invention are illustrated and described. In particular, FIGS. 3-23 provide representative examples of pages or screens accessible by a user when using the present invention. While the illustrated system is representative of implementing the software in a local computer system that has e-mail and web access capabilities, it will be understood and appreciated that the following discussion can equally apply to embodiment 22 as described above.

In operating the software of the present invention, the user is presented with certain functions that appear on all of the screens or pages as shown in FIGS. 3-17 and 20-23. Certain functions appear on each screen. These functions include main menu 36, e-mail support connection 38, web site connection 40, and a summary 42 of the total tax deductions and tax savings of the user. Main menu 36 allows a user to access various portions of the software such as donations made 44, personal information 46, charity information 48, various browse items 50, and various reports 52. The main menu also allows the user to return to home page 54 at any time. E-mail support connection 38 is an e-mail address that allows the user to obtain assistance for operating the software. Web site connection 40 is a link to, for example, <www.itsdeductible.com>, that offers general information about the software of the present invention. Summary 42 provides an up-to-date calculation of the cumulative amount of the tax deduction the user may take and an associated tax savings to the user for a given year. The deduction amount is the total value of all charitable donations made to date in a given year. The savings is the amount of money that the user will save in taxes in a given year taking into consideration the total value of all charitable donations made and the tax rate imposed on the user's income for that year.

Figure 3:
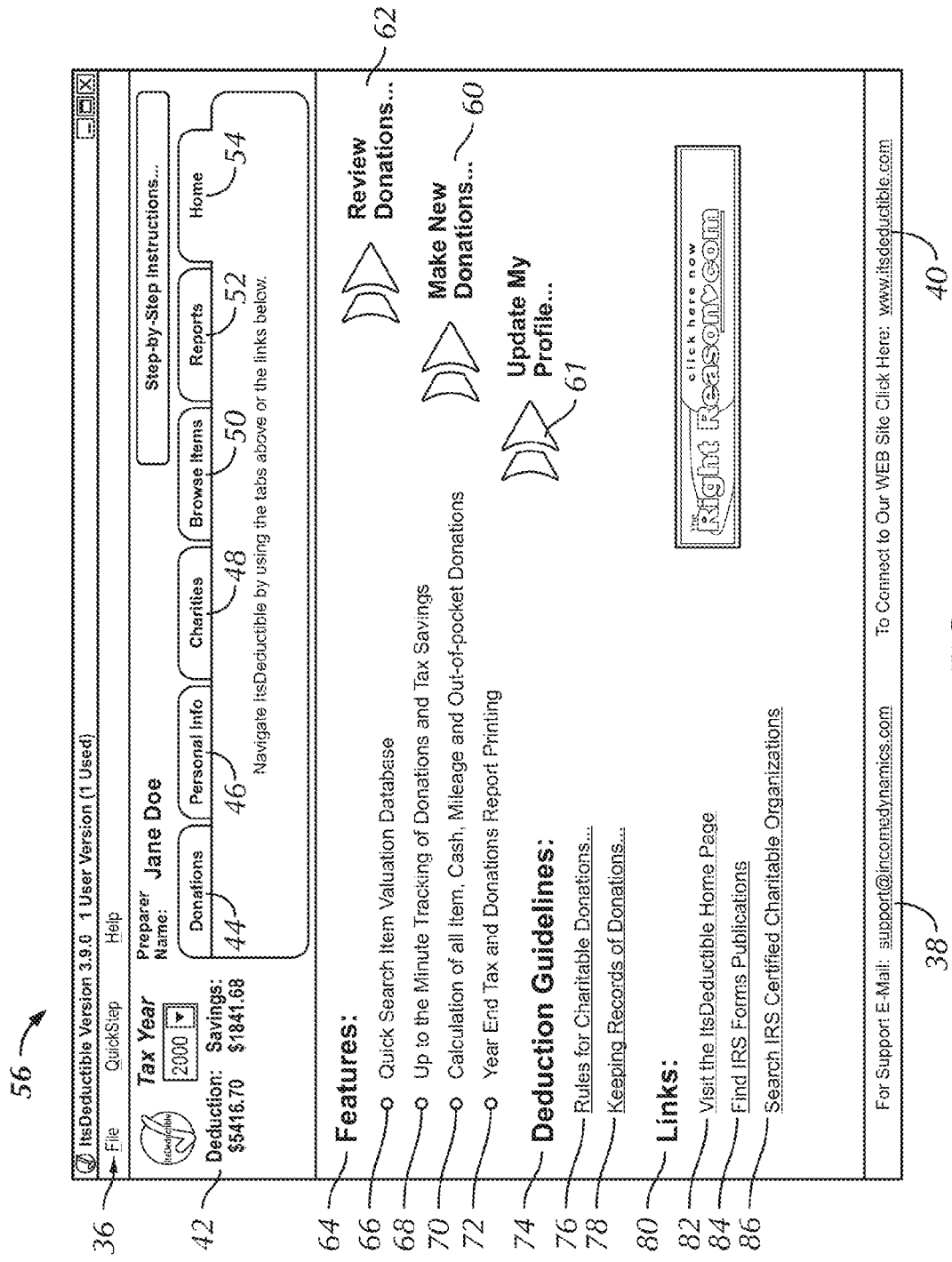

When a user begins using the software of the present invention, home page 56 is presented to a user. With reference to FIG. 3, home page 56 is a graphical user interface that allows a user to navigate the software. Specifically, the user has the option of selecting various options: getting started 58, make new donations 60, or review donations 62. By selecting one of the three options, a user can quickly navigate the software. The use of getting started 58, make a new donation 60, and review donations 62 options will be more fully described below. In addition to the above options, home page 56 lists certain other features 64 of the software of the present invention such as Quick Search Item Valuation Database 66, Up to the minute Tracking of Donations and Tax Savings 68, Calculation of all Item, Cash, Mileage and Out-of-pocket donations 70, and Year End Tax and Donations Report Printing 72. Further, home page 56 provides the user with links to general deduction guidelines 74 such as Rules for Charitable Donations 76 and Keeping Records of Donations 78. Further, home page 56 has a Links area 80 in which the user has access to other helpful information in preparing a tax return and/or in making charitable donations, such as a link to <www.ItsDeductible.com> 82, IRS Forms Publications 84, and Search IRS Certified Charitable Organizations 86.

Figure 4:
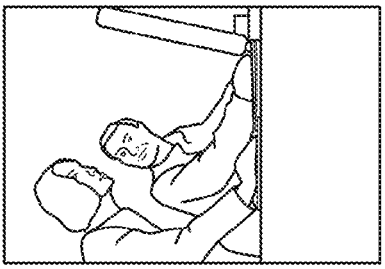

By selecting the getting started 58 option on home page 56, the software will present a user with personal information page 90. With reference to FIG. 4, personal information page 90 is a graphical user interface that provides the user with instructions 94 regarding the type of personal information that must be provided. Instructions 94 inform the user that a name, address, current state tax rate, and current federal tax rate will need to be provided. All of this information will be used in printing receipts, preparing total tax deductions and calculating tax savings. Once instructions 94 have been read, the user may select the next option 96 and the software guides the user to the screen presented in FIG. 5.

Figure 5:
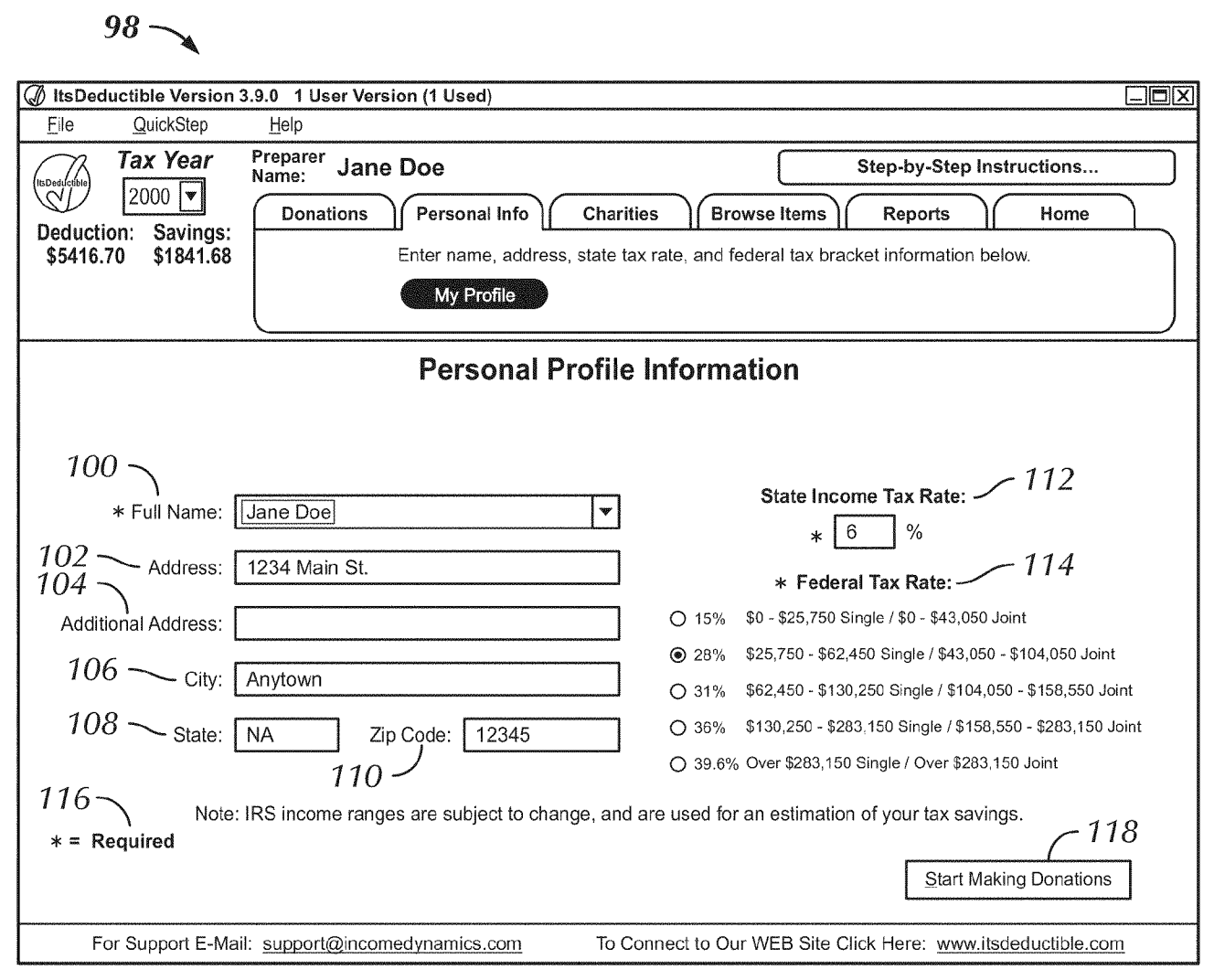

Turning now to FIG. 5, a personal information data input page 98 is illustrated. Personal information data input page 98 is a graphical user interface providing data entry fields wherein a user enters a name 100, address 102, additional address 104 if applicable, city 106, state 108, zip code 110, current state income tax rate 112, and current federal income tax rate 114. After all required information 116 has been entered, the user may select start making donations option 118 and the software guides the user to the screen presented in FIG. 6.

Figure 6:
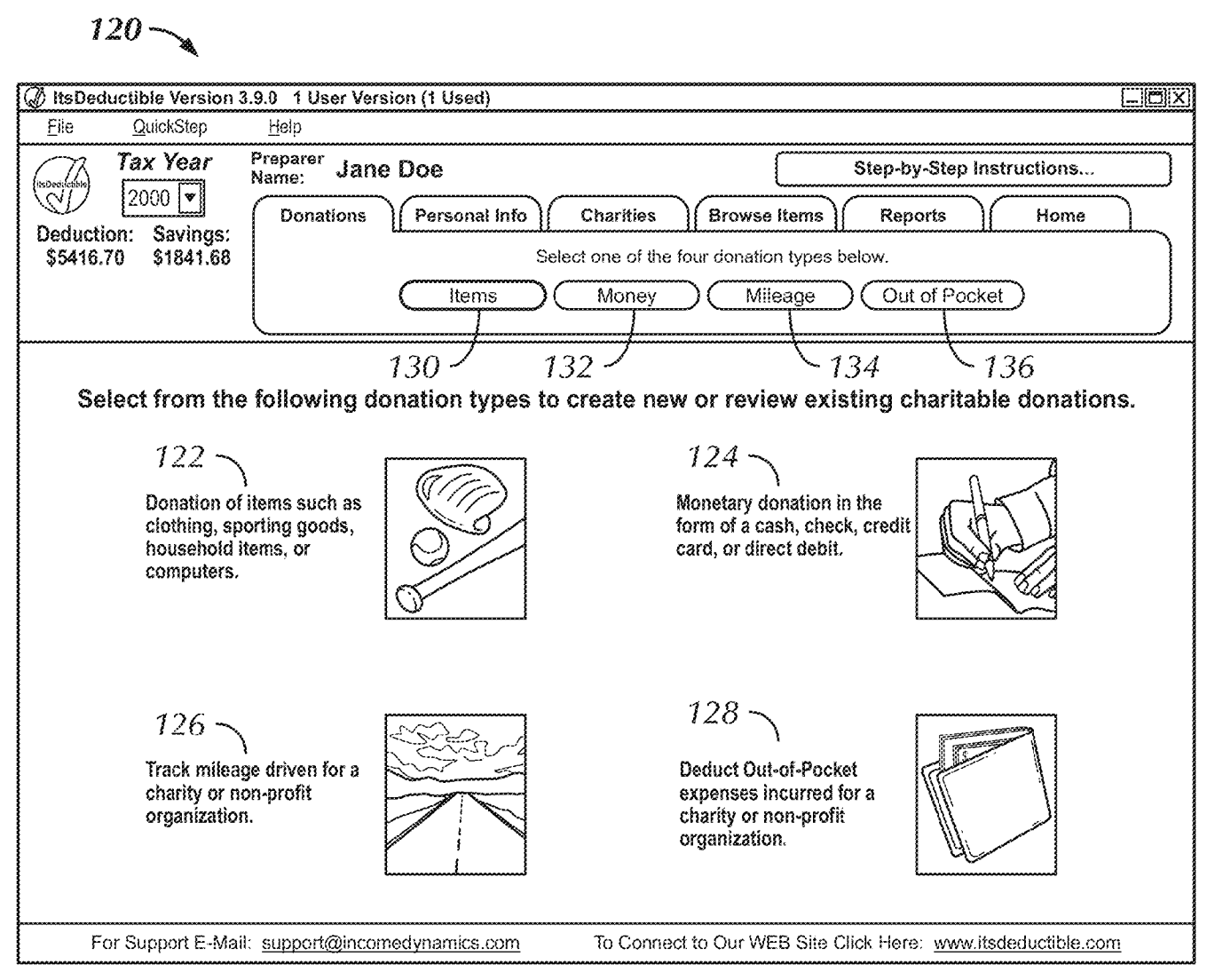

Turning now to FIG. 6, once the start making donations 118 option is selected, the user is presented with a donation selection page 120. Donation selection page 120 is a graphical user interface that allows a user to select a donation type or review existing charitable donations. The types of charitable donations the user can create or review should include any type of donation accepted by the applicable taxing authority as a charitable donation for purpose of tax deduction. In the embodiment shown, the donations include items donated 122, monetary donations 124, mileage donations 126, and out-of-pocket expenses 128 incurred for a charity. Items donated 122 may include various types of clothing, sporting goods, household items, computers, and the like. Monetary donations 124 can be in the form of cash, check, credit card, direct debit, and the like. Mileage donations 126 include those miles driven for a charity or non-profit organization. Out-of-pocket expenses 128 are expenses incurred for a charity or non-profit organization. Although not shown in the figures, it is also within the scope of the present invention to include financial securities as a type of charitable donation. Once the user decides what type of charitable donation has been made, the user selects the type of donation (i.e., item 130, money 132, mileage 134, or out-of-pocket 136) from main menu 36. Alternatively, the user may select the pictorial representations 122, 124, 126, 128 that illustrate and accompany each type of donation.

Figure 7:
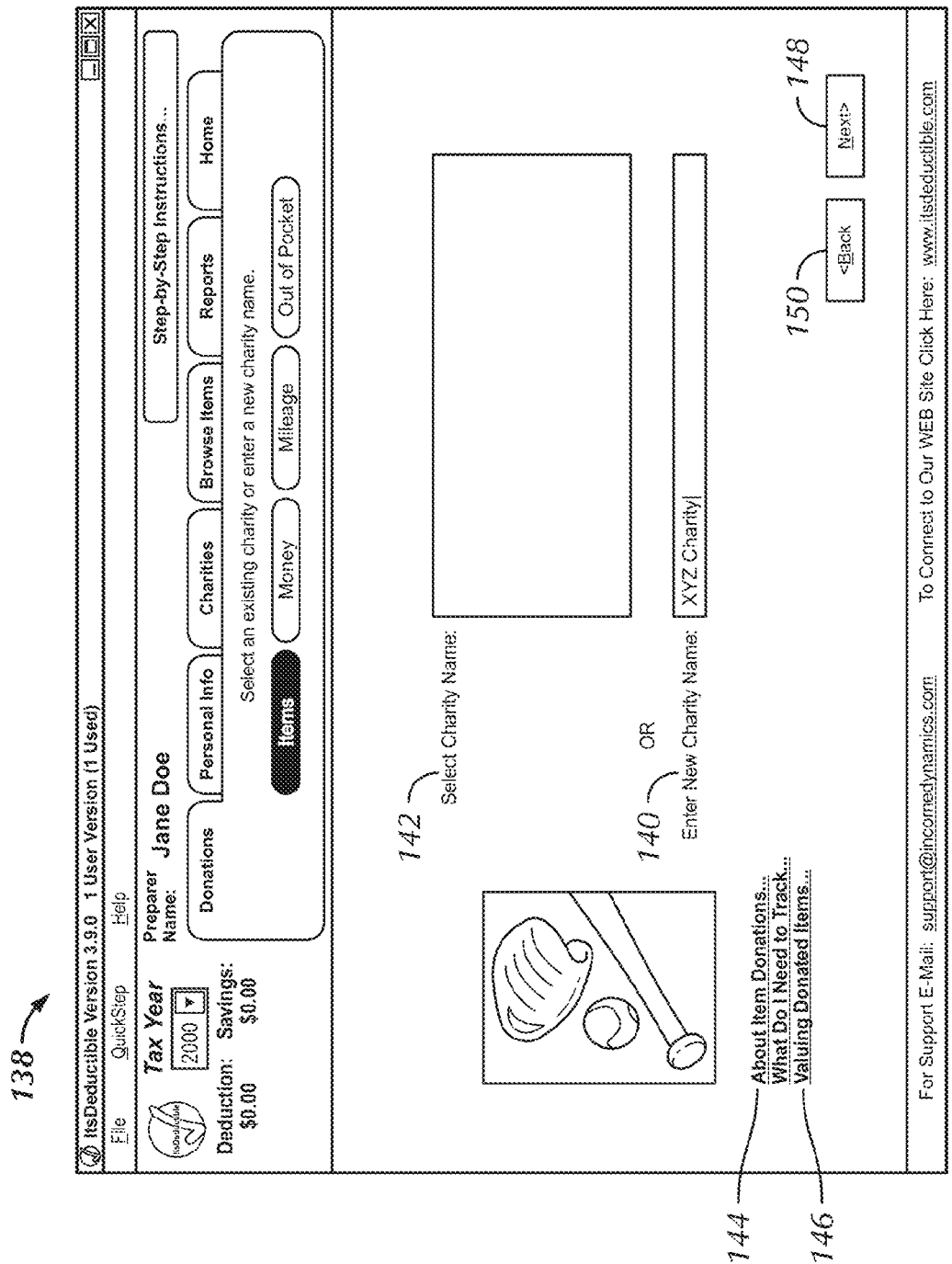

Once a type of charitable donation is selected, the user is presented with charity input page 138 illustrated in FIG. 7. Charity input page 138 is a graphical user interface that allows the user to enter a new charity 140 name or select a charity 142 that the user has previously entered. Charity input page 138 also enables the user to select a link that offers information About Item Donations 144 and Valuing Donated Items 146. After a new charity name has been entered 140 or an existing charity has been selected 142, the user selects the next option 148. When the user wants to change the type of donation made, the back option 150 may be selected and the software will take the user to donation selection page 120 as described above.

Figure 8:
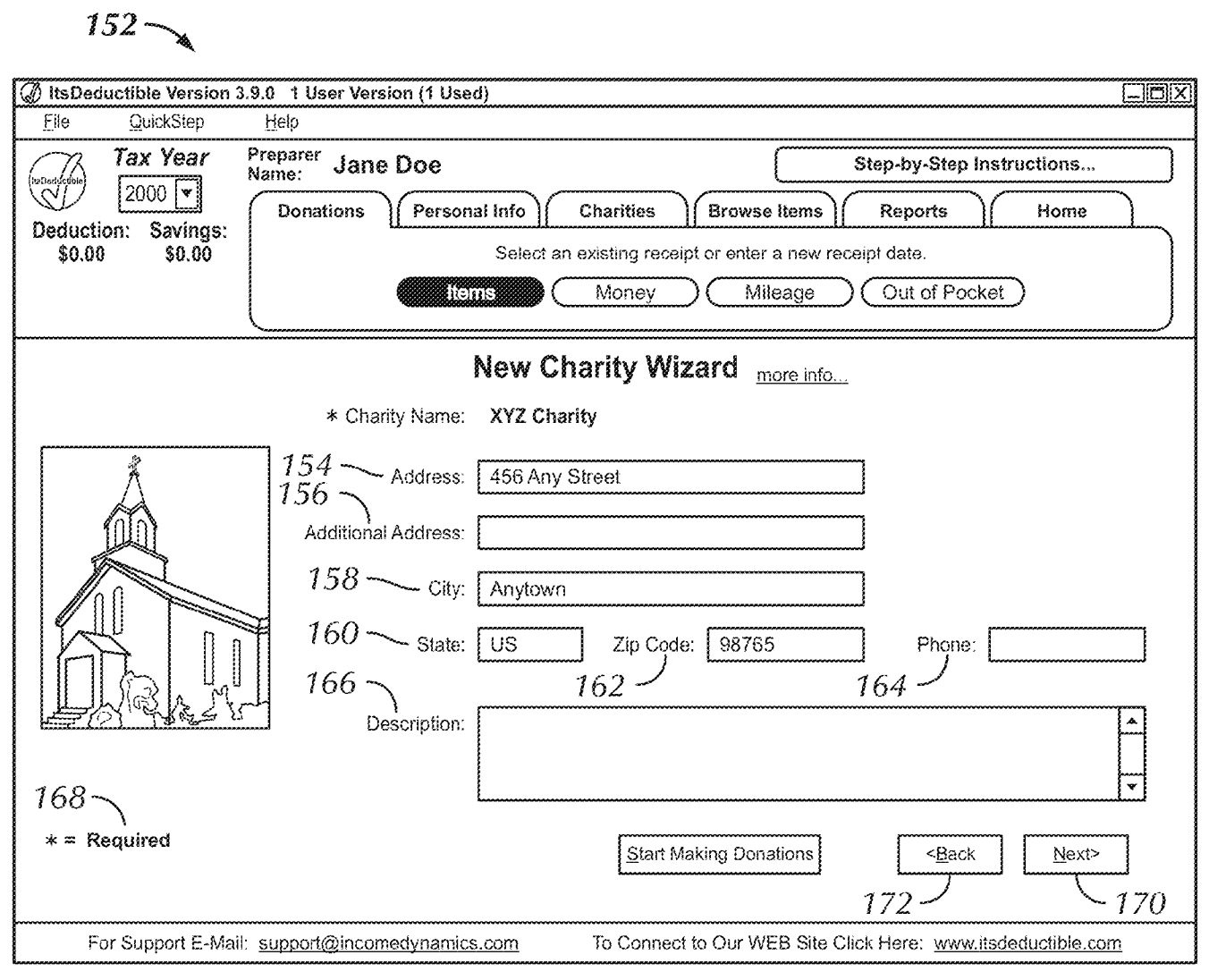

With reference to FIG. 8, when a new charity 140 has been entered and next option 148 has been selected, the new charity input page 152 is presented to the user. New charity input page 152 is a graphical user interface providing data entry fields for entering the new charity's address 154, additional address 156 if applicable, city 158, state 160, zip code 162, phone number 164, and a description of the charity 166. Alternatively, various charities may be selected from a pull-down menu. Once the required information 168 has been entered, the user selects the next option 170. When the user wants to change the charity name, the back option 172 may be selected and the software will take the user to charity input page 138 as described above. It is anticipated that the charity input page 152 may also prompt the user to input a URL address of the charity's web site, an e-mail address for the charity or some other designation to enable direct communication with the charity.

Figure 9:
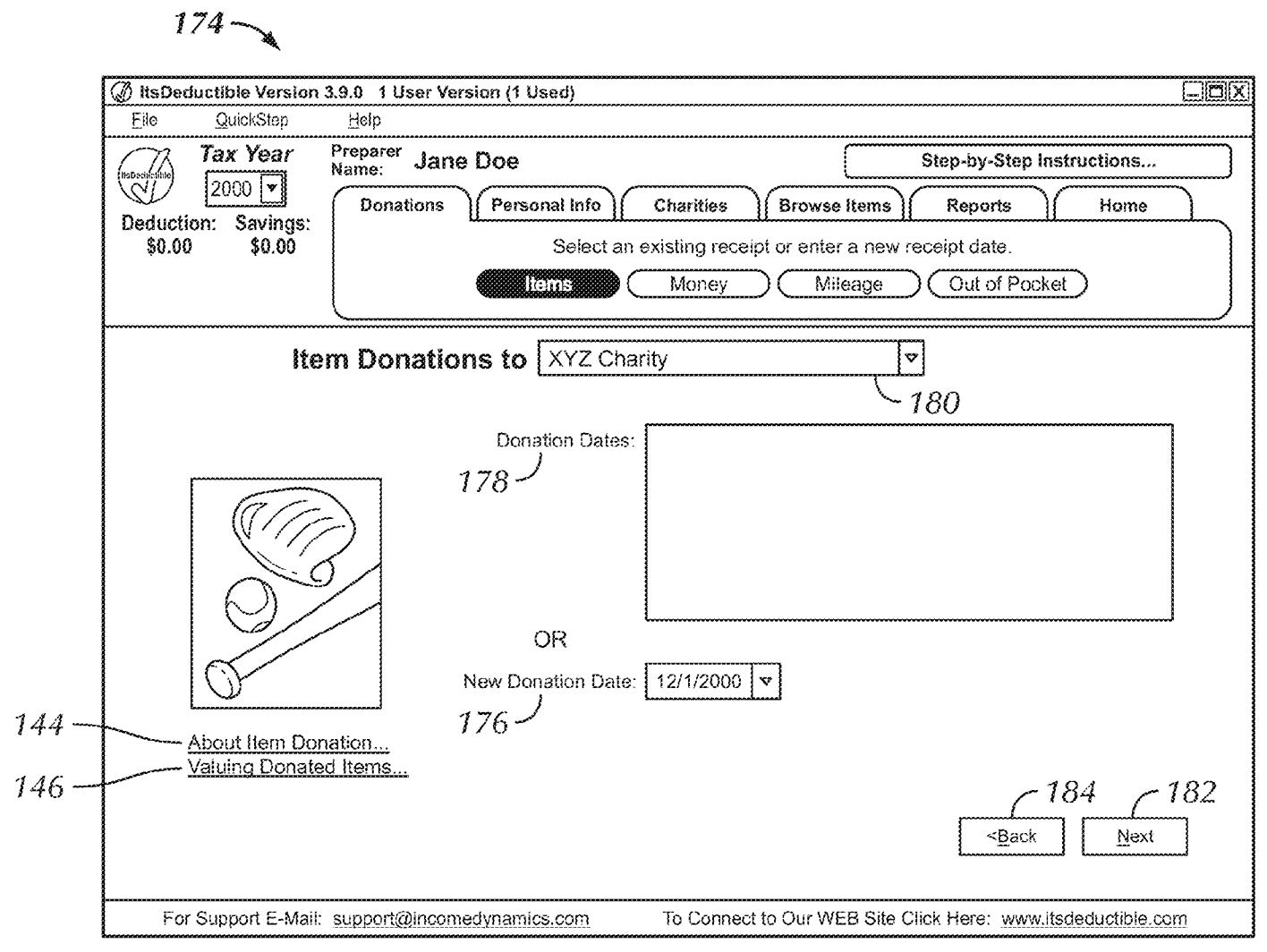

With reference to FIG. 9, once the charity information has been entered and the next option 170 has been selected, the user is presented with donation date input page 174. Donation date input page 174 is a graphical user interface that allows the user to enter a new donation date 176 or use a previous donation date 178. In addition, donation date input page 174 provides a pull down menu 180 that enables the user to change the charity name. As in FIG. 7, donation date input page 174 enables the user to select a link that offers information About Item Donations 144 and Valuing Donated Items 146. Once the required donation date has been entered, the user selects the next option 182. When the user wants to change the charity information, the back option 184 may be selected and the software will take the user to new charity input page 152 as described in the previous paragraph.

Figure 10:
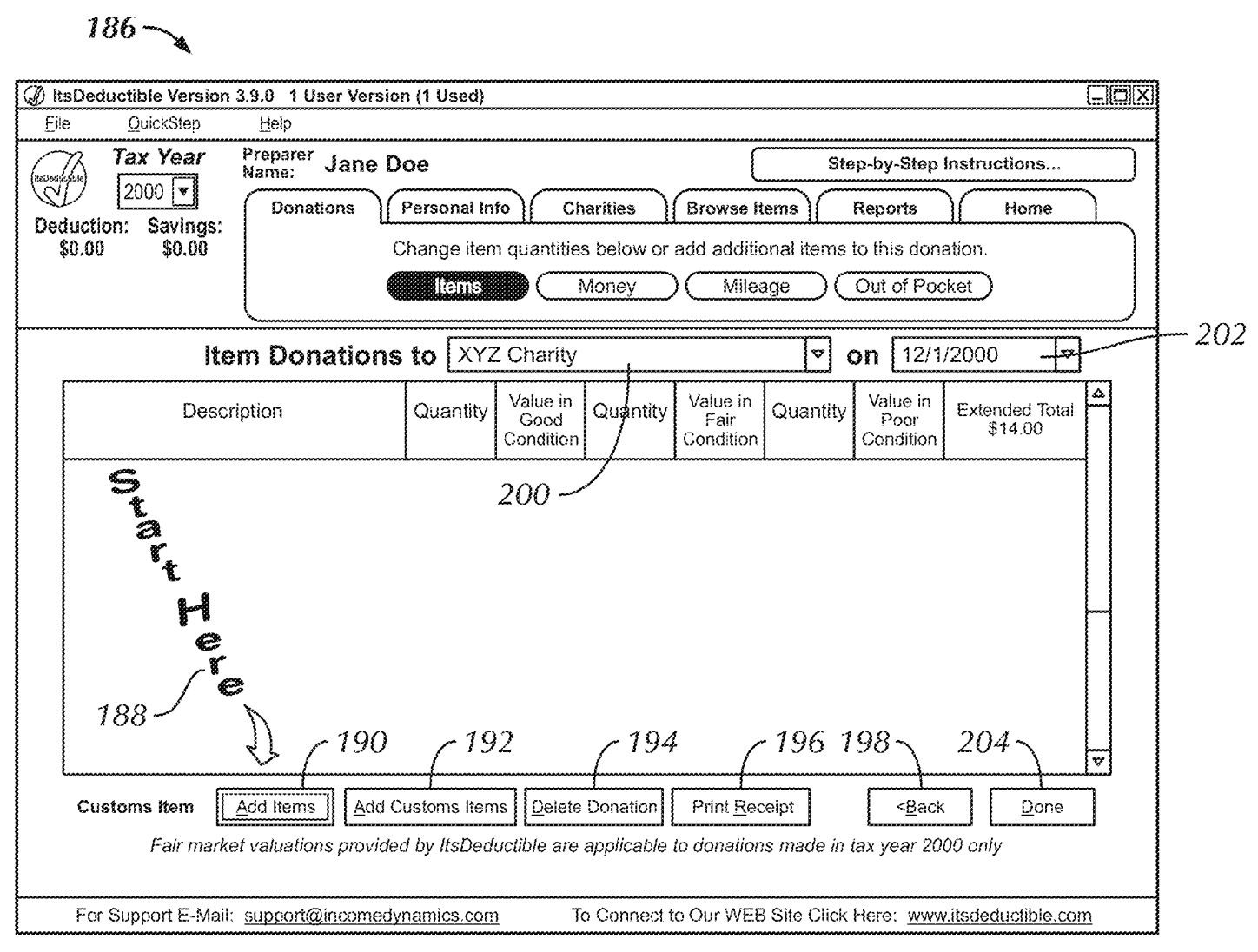
Figure 11:
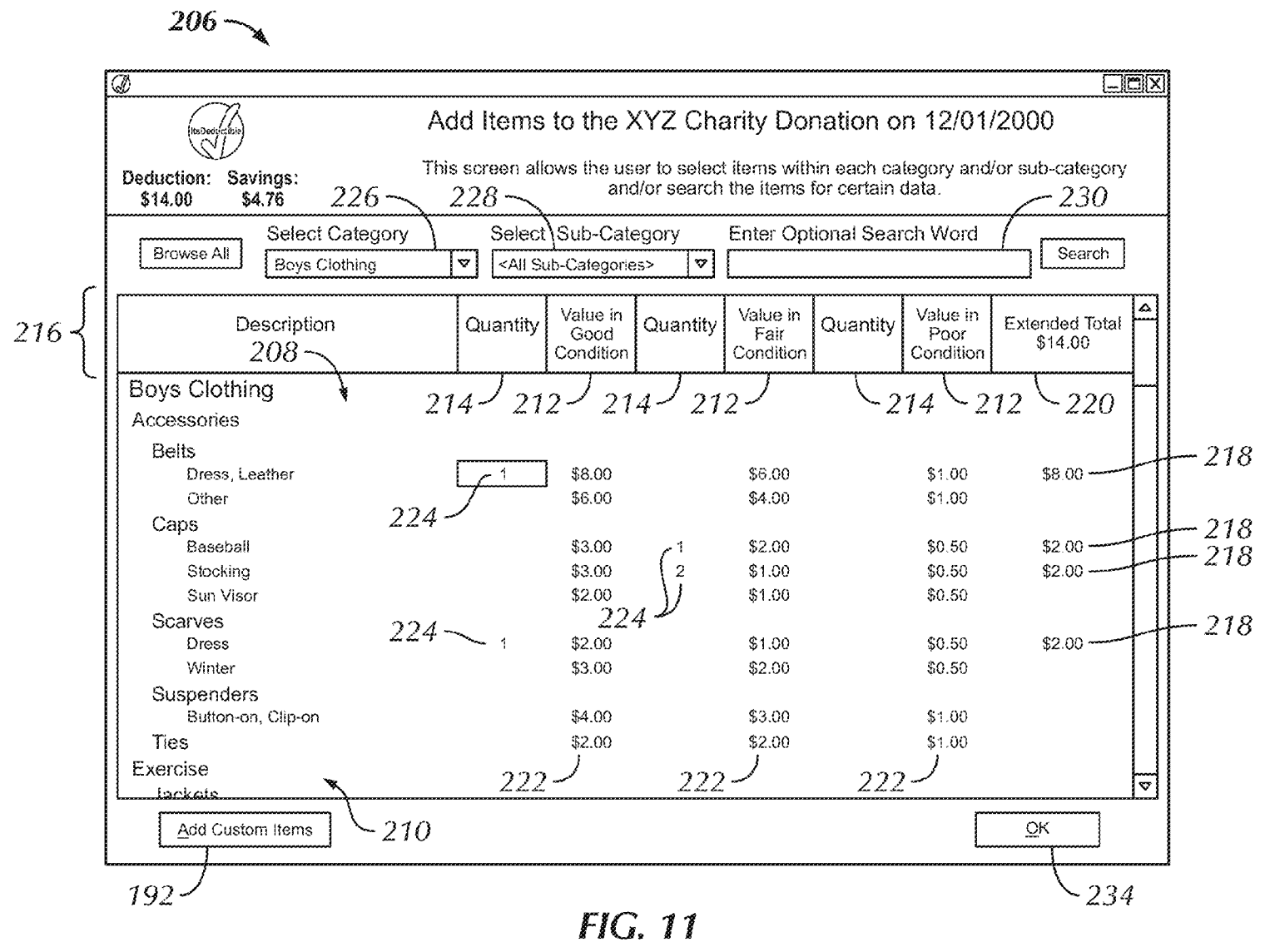
Figure 12:
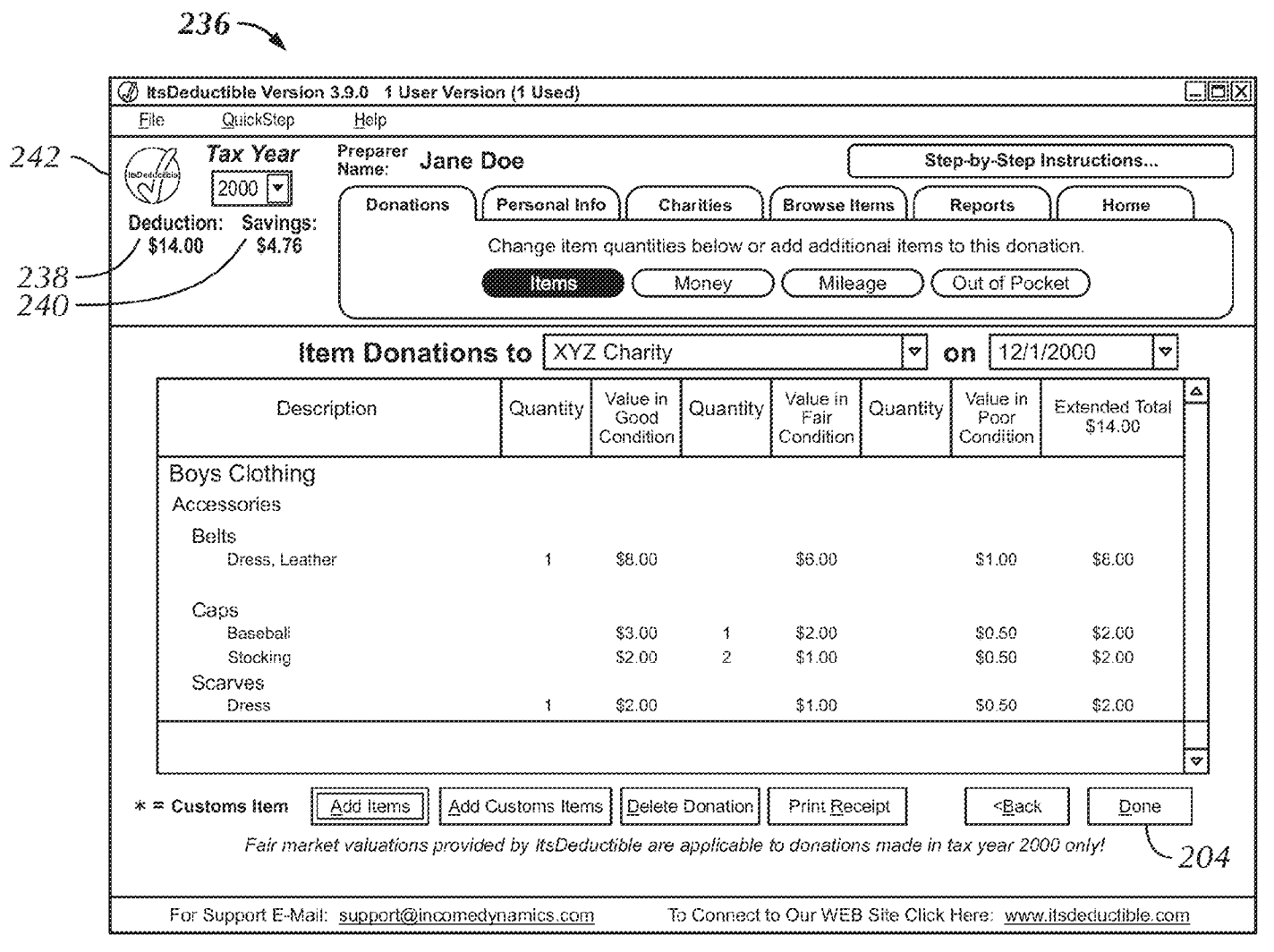

Referring back to FIG. 6, when item donated option 122, 130 is selected, the user will be presented with the screens illustrated in FIGS. 10-12. In the case that the option for a monetary donation 124, 132, a mileage donation 126, 134, or an out-of-pocket expense 128, 136 donation is selected, the user will be presented with the screens illustrated in FIGS. 20-22 as described below. With reference to FIG. 10, once a donated item has been entered 122, 130, a donation date has been entered, and next option 182 has been selected, the user is presented with item donation input page 186. Item donation input page 186 is a graphical user interface that allows a user to add or delete items from donation table 188 which lists donations which have been made to charitable organizations. The user can add items to donation table 188 by selecting add items option 190. The user also has the option of adding items to donation table 188 that are not included in the software database by selecting add custom items option 192. The user also can remove a donated item from donation table 188 by selecting delete donation option 194 and print a receipt of donated items by selecting print receipt option 196.

The charitable organization and the donation date can be changed by pull down menus 200, 202. When the user wants to change the donation date, the back option 198 is selected and the software will take the user to donation date input page 174 as described in the previous paragraph. Once all of the donations have been added to donation table 188 and they are listed by description, quantity, and condition, the user selects the done option 204 and the software guides the user to the screen presented in FIG. 11.

Turning now to FIG. 11, item-deduction page 206 is illustrated. Item-deduction page 206 is a graphical user interface that allows a user to enter a quantity of items donated which are displayed on table 208. Column 210 lists the items that may be donated. Columns 212 lists the value of the items donated depending on the donated item's condition. Column 214 lists the quantity of items donated, information that will be provided by the user. Column 216 lists the total amount of the deduction for each item listed in column 208, as well as an extended total 220 indicating the total deduction for all charitable donations. Value 222 of the item donated is dependant on whether the condition of the item is good, fair, or poor. When the user wants to enter an item donated into table 208, the type of item donated would be selected from column 210 and the condition of the item (i.e., good, fair, or poor) determined and input. The number of items donated 224 will also be input. Item-deduction page 206 also has a add custom item option 192 that enables the user to enter items not included in the database of the software of the present invention. When a user wants to change the category or sub-category of items donated, pull down menus 226, 228 may be used to select another donation item. In the alternative, when the user has trouble finding an item donated in pull down menus 226, 228, the user may perform a word search to locate an item donated by entering that word in field 230 and selecting the search option 232. Once the user has completed all donation entries, the close option 234 is be selected and the user is taken to the screen shown in FIG. 12.

With reference to FIG. 12, once close option 234 is selected, the user is presented with a summary of item donation input page 236. Summary of item donation input page 236 is a graphical user interface that allows a user to view a summary of all donations input into the software of the present invention. The description and function of FIG. 10 as described above is applicable to FIG. 12 as well as seen in the upper left corner of summary of item donation input page 236, there is a summary 42 of the current total deductions 238 and total tax savings 240 for a given year or multiple years. Once the user is finished reviewing summary of item donation input page 236, done option 204 should be selected. The user is then forwarded to the screen illustrated in FIG. 13.

Figure 13:
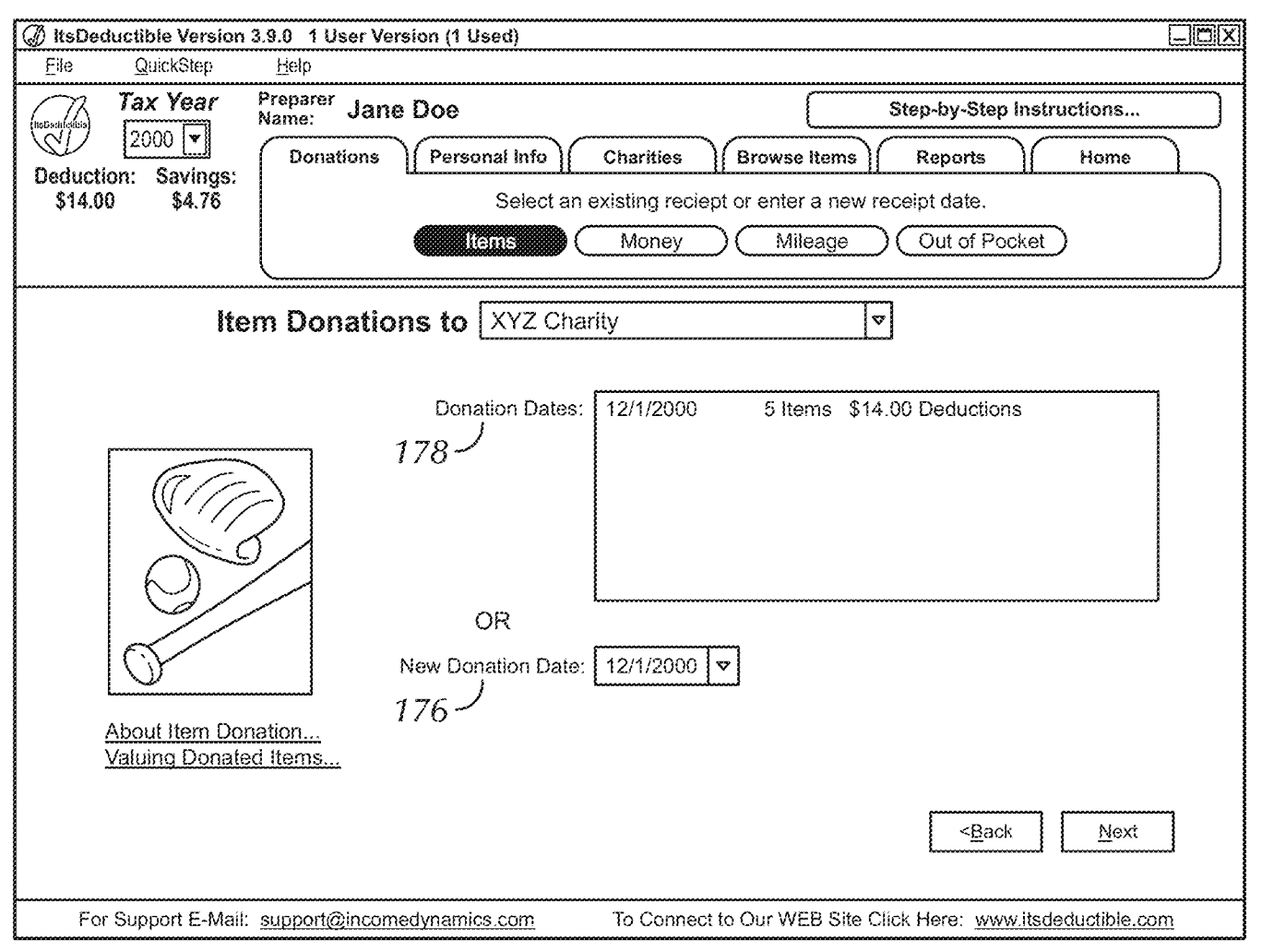

Turning to FIG. 13, the user is presented with existing receipt date or new receipt date page 242. Existing receipt date or new receipt date page 242 is a graphical user interface that allows the user to enter a new donation date 176 or select a previous donation date 178. The description and function of FIG. 9 as described above is applicable to FIG. 13 as well. When the user wants to continue to enter donations in the software of the present invention, the user may proceed as described in the pervious paragraph explaining FIG. 9.

Figure 14:
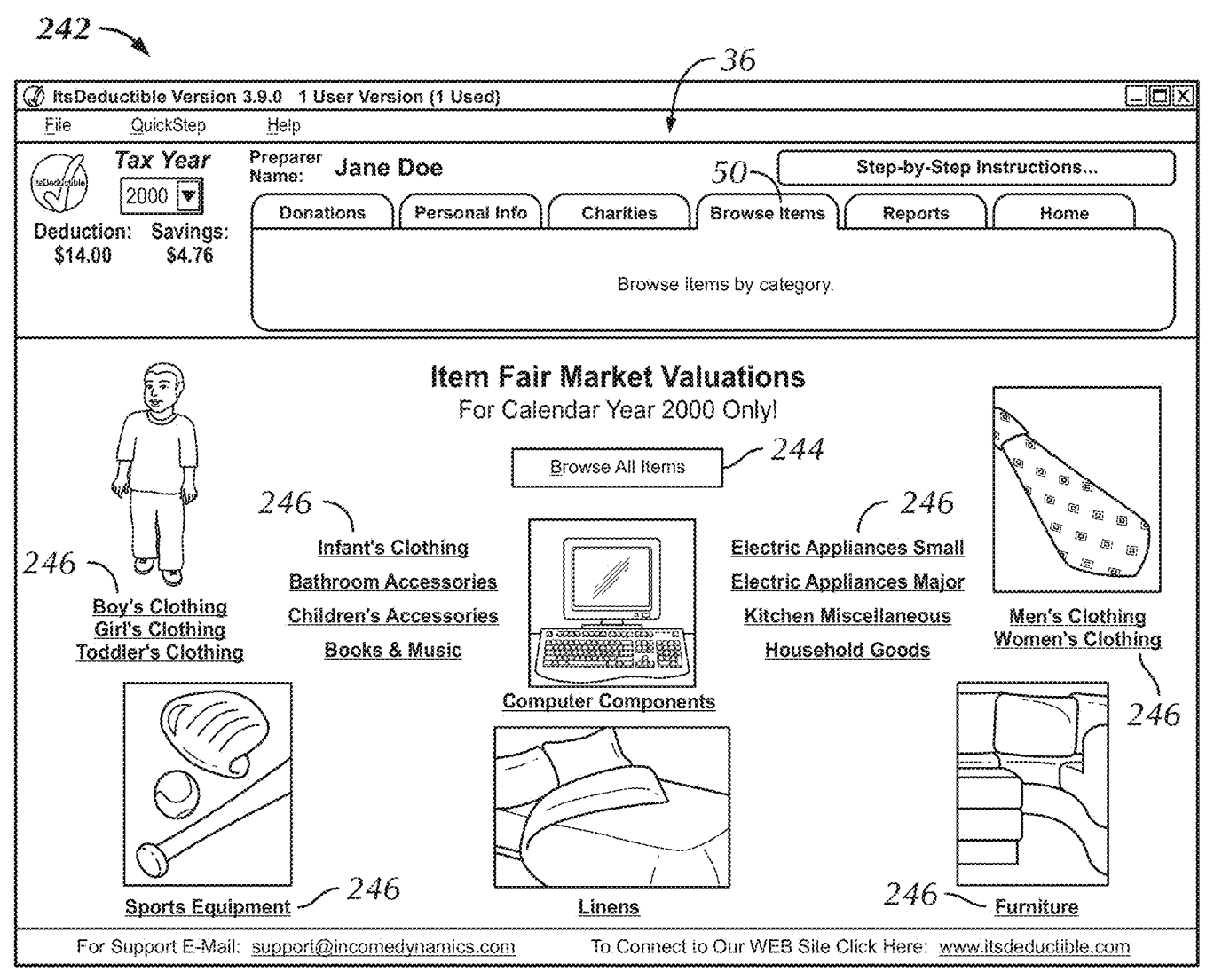

With reference to FIG. 14, when the user wants to browse donation items contained in the software database of the present invention, browse items 50 should be selected from main menu 36. Once browse items 50 is selected, menu for the tax deductible value of items 242 is presented to the user. Menu for the tax deductible value of items 242 is a graphical user interface that allows the user to browse all the items within the software database by selecting option 244 or browse the items by category 246.

Figure 16:

As shown in FIGS. 15 and 16, the user is presented with tables 248 and 250. Both tables 248 and 250 present pull down menus 252, 254 similar to those shown and described in FIG. 11. The user can browse all categories and sub-categories of items or use pull down menus 252, 254 to narrow the search. The user also can perform a word search to locate an item donated by entering that word in field 230 and selecting the search option 232. Table 256 provides deduction amounts for charitable donations of categories and sub-categories of items. The deduction amounts for any given year in which the donation is made may vary depending upon the applicable rules of the taxing authority for that year. In the embodiment shown, the 2001 IRS tax year rules indicated the deduction amount would be the tax deductible value of the item taking into consideration the condition of the item. Thus, in this embodiment, the deduction amounts attributable to each item are dependent upon the condition of the item. Once the user has completed the search, close option 258 is selected.

Figure 17:
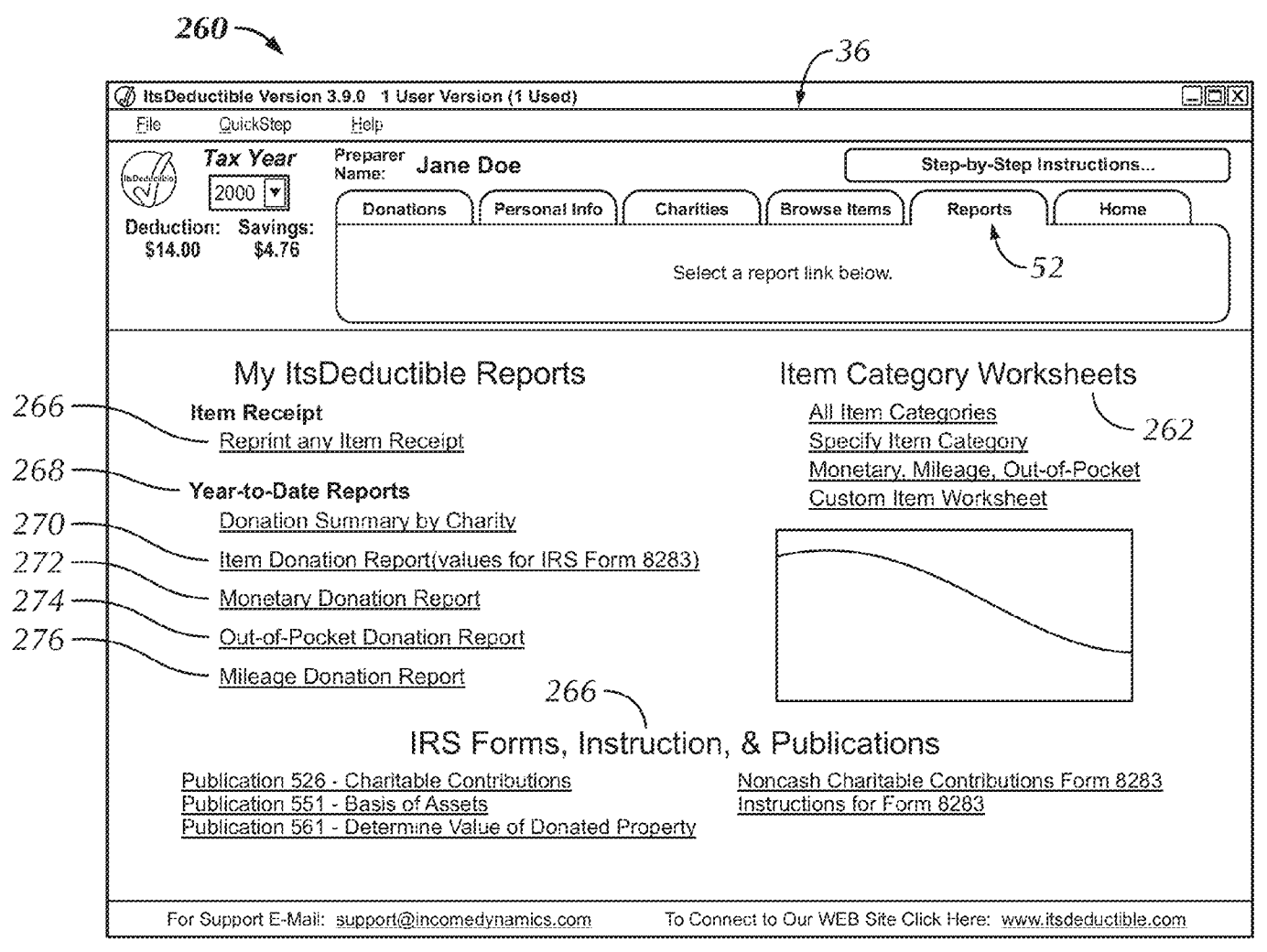

When the user wants to obtain a report of items contained in the software of the present invention, reports 52 may be selected from main menu 36. With reference to FIG. 17, once reports option 52 is selected, report link page 260 is presented to the user. Report link page 260 is a graphical user interface that allows the user to produce item category worksheets 262 such as, for example, all categories, boy's clothing, computers, girl's clothing, household goods, infant's clothing, men's clothing, toddler's clothing, woman's clothing, and if added to the software of the present invention, financial securities.

The user can also print an item receipt 264 for any item or items selected. This enables the user to print a receipt before donating the items, bring that receipt to the charitable organization at the time of donating the items, and have the charitable organization confirm that such donation was made by signature or otherwise. This receipt could be used by the user to confirm the donation in case of audit. In a preferred embodiment, the item receipt 264 may contain information on the items donated and/or information regarding the donor such as donor name and address. The charitable organization can make a copy of the receipt or otherwise obtain this information from the receipt at the time of donation to assist with their recordkeeping. This information provides the charitable organization with valuable data such as what type of donations they are receiving, when such items are typically donated, where such items are being donated, and the types of donors. In a most preferred embodiment, the information is a bar code, DATAGLYPH™, or other code printed on the item receipt 264. This bar code can be scanned by the charitable organization and the donation information stored within the charitable organization's recordkeeping software. Alternatively, information relating to the donation could be downloaded from the software of the present invention onto any computer readable medium such as a floppy disk or CD-ROM, or may be downloaded to a transportable computer device such as a hand-held computer. The information can then be uploaded to the recordkeeping software of the charitable organization at the time of donation.

IRS forms, instructions & publications 266 can also be obtained on report link page 260 and include Publication 526 for charitable donations, Publication 551 for basis of assets, Publication 561 for determining value of donated property, Form 8283 for non-cash item donations, and instructions for form 8283. In addition to printing item receipts 264 and obtaining IRS forms, instructions & publications 266, the user can obtain year-to-date reports 268 for item donations 270, monetary donations 272, out-of-pocket donations 274, and mileage donations 276 for any given year.

With reference to FIG. 18, when the user selects year-to-date report 268, the user will be presented with year-to date page 278. Year-to date page 278 is a summary of non-cash item donations including a description of the items 280, condition of the items when donated 282, number of items donated 284, tax deductible value for each item 286, total deduction for each item 288, and a grand total item donation 290 for the selected year.

The software of the present invention maintains a running tally of the total amount of the user's charitable donations for any given year and/or multiple years. If the total amount of charitable donations or other specified characteristic of those donations has a special tax effect, the software may be programmed to notify the user of the special tax effect and to assist the user in obtaining or completing any associated forms. By way of example, in the present embodiment, should the total amount of non-cash item charitable donations reach the level where a Form 8283 is required, the user is notified by a message on the display 20. Currently, the IRS requires Form 8283 to be filled out when the user has donated items with tax deductible valuations totaling $500 or more. In addition to the notification, upon reaching $500 in non-cash item donations, the software is programmed enable an option allowing the user to generate a completed tax form 8283 with the required information populated from the donation information. Thus, once the user is notified that it will be required to submit a completed form 8283 with it's tax return, the option of printing a blank tax form 8283 or having the software generate a completed form 8283 based upon the user's previously entered information regarding non-cash donated items is available.

In a preferred embodiment, the software provides a link to the latest instructions for tax form 8283 provided on the IRS website. The current IRS website is located at <www.irs.gov>. If the user selects the option of printing out a blank form 8283, the software will print out the blank form and also provide a link to the location on the IRS website that has form 8283. If the user selects the option of generating a completed form 8283, then stored donation data is used to fill in the required information into the appropriate blanks. In the current version of form 8283, Section A-Part 1 will be filled out in its entirety.

It should be understood that while the present embodiment contemplates notifying the user when a form 8283 is required and enables a user to print off the form and/or have the form populated with information from the software database, other types of notifications and forms are contemplated by the invention. It is anticipated that the taxing authorities may adopt any number of rules over time mandating that, certain specified characteristics of donations will have a special tax effect. This special tax effect may be the requirement to use an additional form or schedule, or may place a certain threshold or ceiling on deductible amounts. The software of the present invention may be programmed to notify the user whenever those specified characteristics have been met, and assist the user in dealing with the special tax effect.

Figure 19:
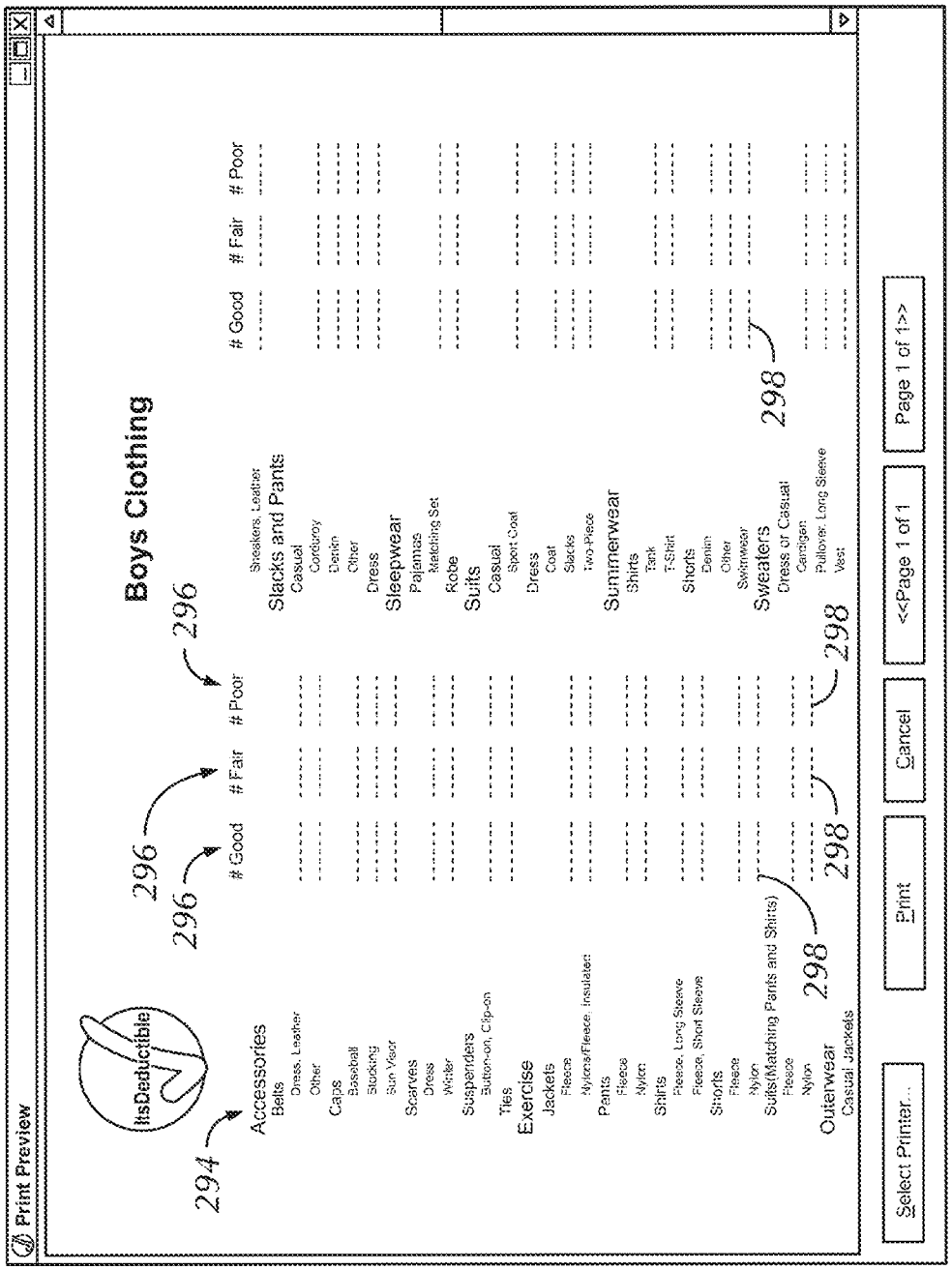

With reference to FIG. 19, worksheet page 292 is a table that the user can print and manually tabulate the amount of deductions for charitable donations. The user will be presented with worksheet page 292 if the user selects an item category worksheet 262 for boy's clothing. Worksheet page 292 includes a column of items 294, column for the condition of items 296, and spaces 298 for the user to manually fill in the value of items donated. Worksheet page 292 is available for all categories stored in the software of the present invention.

Figure 20:
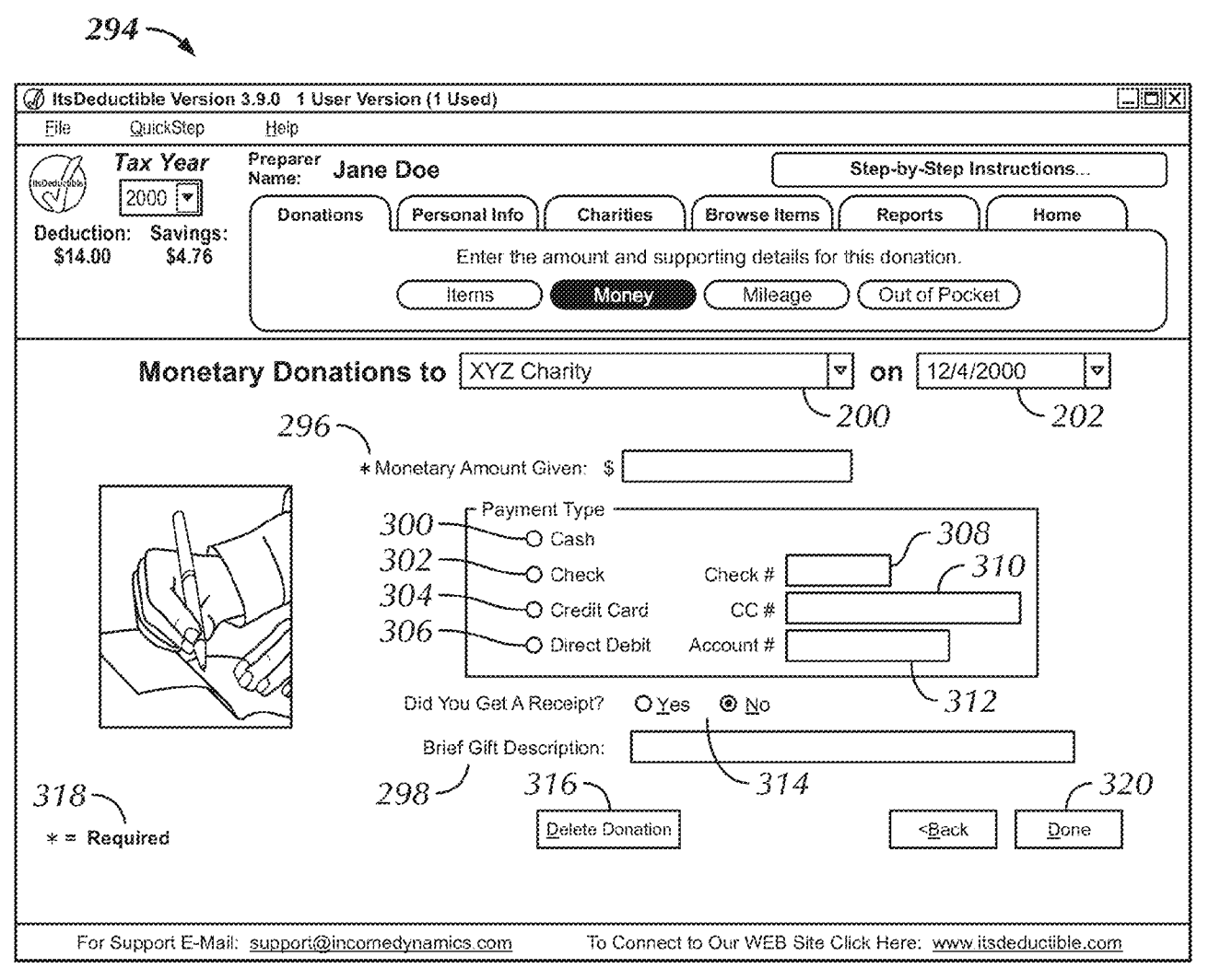

Referring back to FIG. 6, when the user selects the option of a monetary donation 124, 132, monetary donation input page 294 will be presented as shown in FIG. 20. Monetary donation input page 294 is a graphical user interface providing data entry input fields for a monetary amount given 296 and a brief description 298 of the monetary amount given. Monetary donation input page also provides a toggle switch that the user can select to indicate whether the monetary donation was made in cash 300, check 302, credit card 304, or direct debit 306. There is additional data entry fields that the user can utilize to enter a check number 308, credit card number 310, or an account number 312. There is also a receipt toggle switch 314 for the user to designate whether a receipt was received. Just as in FIG. 10, the charitable organization and the donation date can be changed by pull down menus 200, 202. If there is a donation that needs to be deleted, the user can select delete donation option 316. Once all the required information 318 has been completed, the user should select done option 320 and the user will be presented with existing receipt date or new receipt date page 242 as shown in FIG. 13. When the user wants to return to donation date input page 174 as shown in FIG. 9, the back option 322 should be selected.

Figure 21:
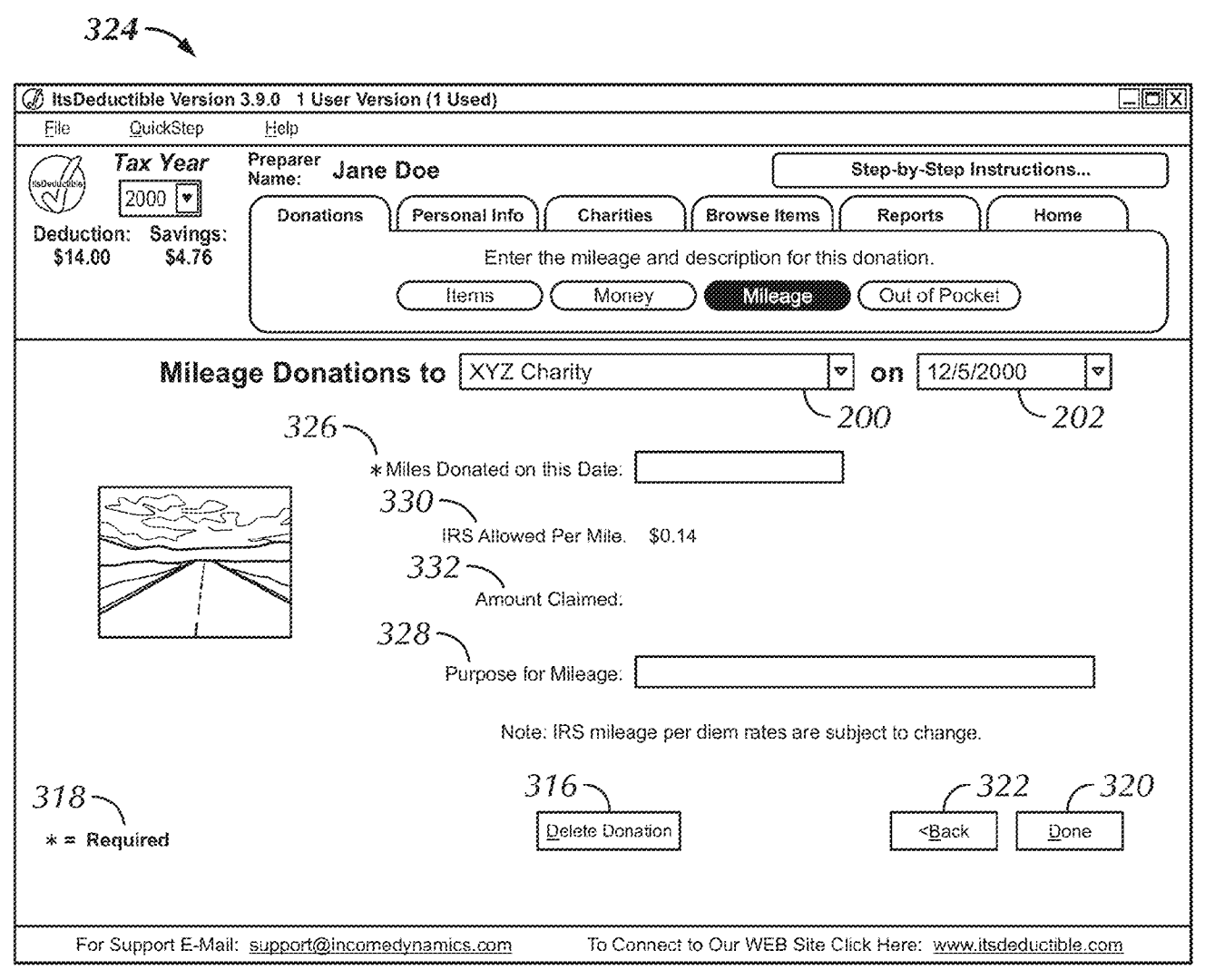

Again referring back to FIG. 6, when the user indicates that a mileage donation has been made 126, 134, mileage donation input page 324 will be presented as shown in FIG. 21. Mileage donation input page 324 is a graphical user interface providing data entry input fields for mileage donated 326 on a specific date and the purpose for mileage 328. Mileage donation input page provides a fixed amount 330 allowed by the taxing authority for a tax deduction for mileage driven for a charitable organization. The amount claimed 332 is the mileage donated 326 multiplied by the fixed amount 330. Just as in FIG. 10, the charitable organization and the donation date can be changed by pull down menus 200, 202. When there is a donation that needs to be deleted, the user may select delete donation option 316. Once all the required information 318 has been completed, the user should select done option 320 and the user will be presented with existing receipt date or new receipt date page 242 as shown in FIG. 13. If the user wants to return to donation date input page 174 as shown in FIG. 9, the back option 322 is selected.

Figure 22:
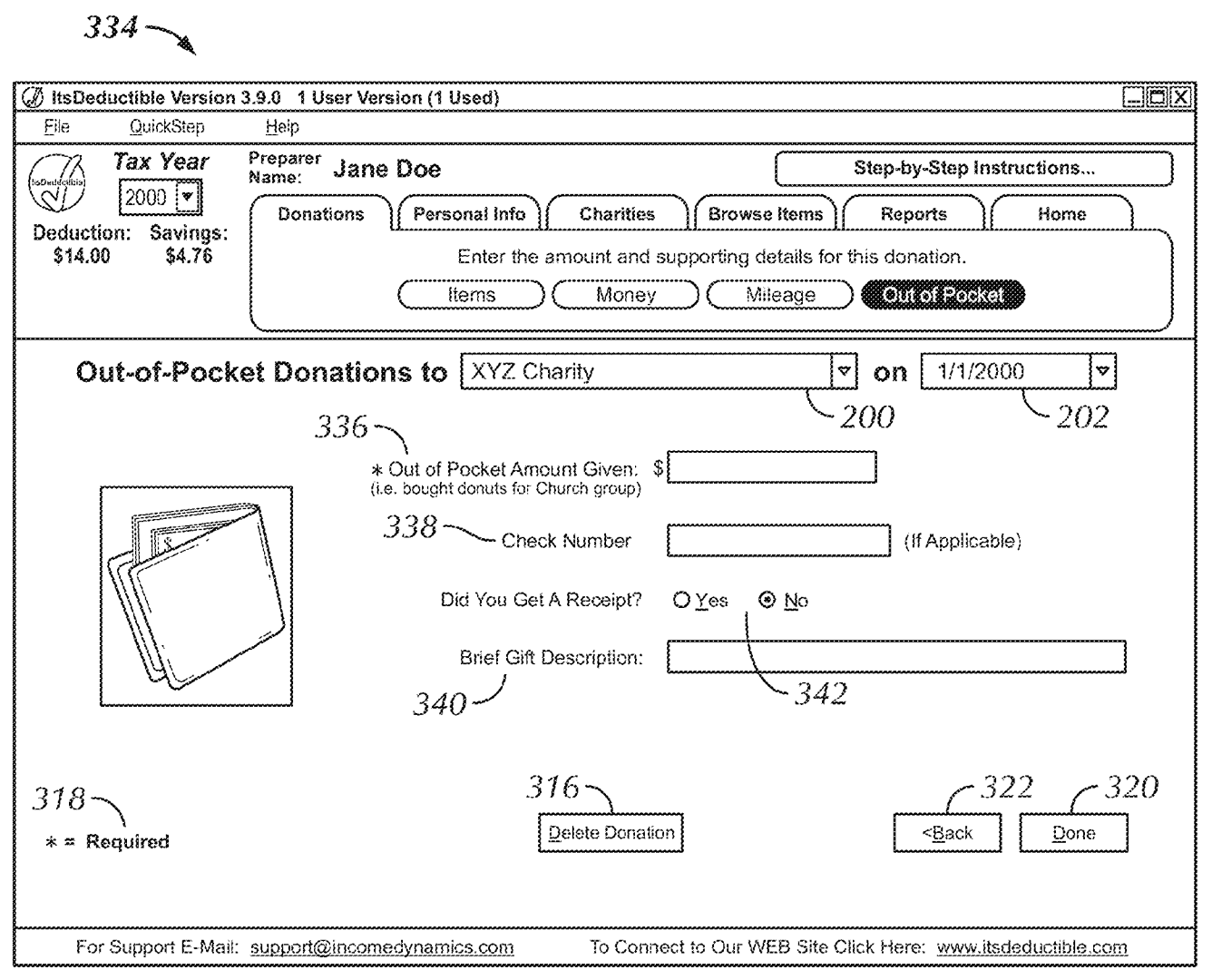

Referring back to FIG. 6, when the user indicates that an out-of-pocket donation has been made 128, 136, out-of-pocket donation input page 334 will be presented as shown in FIG. 22. Out-of-pocket donation input page 334 is a graphical user interface providing data entry input fields for out-of-pocket amounts given 336, check number 338, and a brief description 340 of the out-of-pocket expense. There is also a receipt toggle switch 342 for the user to designate whether a donation receipt was received. Just as in FIG. 10, the charitable organization and the donation date can be changed by pull down menus 200, 202. When there is a donation that needs to be deleted, the user may select delete donation option 316. Once all the required information 318 has been completed, the user should select done option 320 and the user will be presented with existing receipt date or new receipt date page 242 as shown in FIG. 13. If the user wants to return to donation date input page 174 as shown in FIG. 9, the back option 322 is selected.

Figure 23:
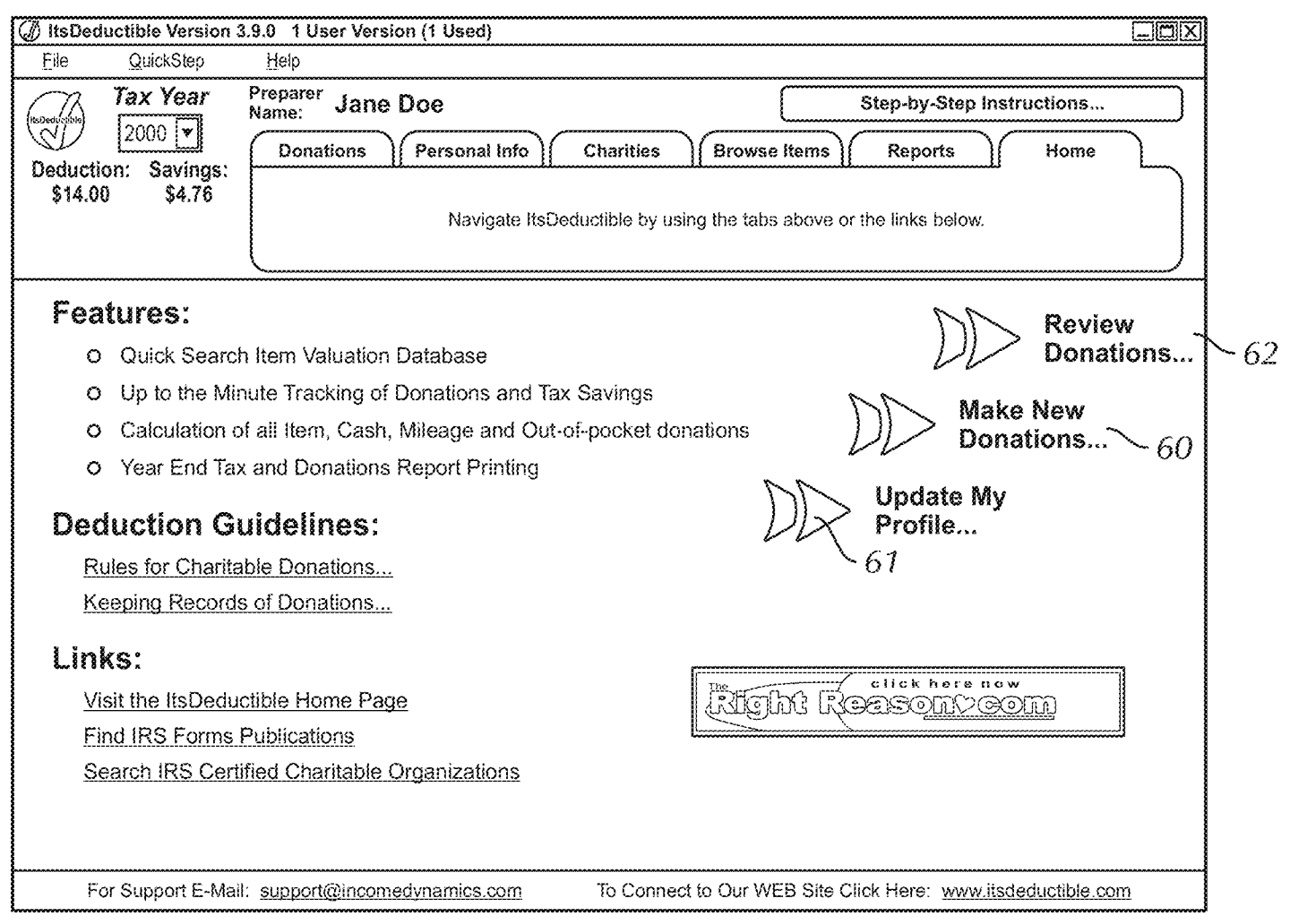

With reference to FIG. 23, if the user has previously used the software of the present invention and wants to update the user's personal profile information, the user should select home 54 from the main menu 36 and select update my profile option 61. After update my profile option 61 is selected, the user will be presented with donation selection page 98 as shown in FIG. 5. Therefore, once update my profile option 61 is selected, the user should proceed in the same manner as described in the paragraph referencing FIG. 5.

If the user has previously used the software of the present invention and simply wants to enter a new donation or review donations already made, then make new donations 60 or review donations 62 option should be selected. After make new donations 60 or review donations 62 option is selected, the user will be presented with donation selection page 120 as shown in FIG. 6. Therefore, once make new donation 60 or review donations 62 option is selected, the user should proceed in the same manner as described in the paragraph referencing FIG. 6.

The software is programmed to allow the user to enter and save information regarding charitable donations at any time of the year. Thus, the user is not relegated to entering all the information at one time (usually in preparing tax returns), but can track the donations throughout the year. Of course, the tax consequences of those donations may change from year to year, or even during a given year. As such, the software is programmed to allow updated tax consequence information to be inputted. Tax consequences of charitable donations include tax deductible valuations for donated items or taxing authority guidelines (including laws, regulations, rules, guidelines or other mandates). For example, to remain compliant with regulations established by the taxing authority, the tax deductible valuations for non-cash item charitable donations must be updated yearly. However, tax deductible valuations for year 2000, for example, will not be available for updating the software database before Jan. 1, 2000. Instead, accurate valuations likely would not be available until later in the year. The software of the present invention allows the user to use the software to record donations made at the beginning of the tax year. As described above in reference to FIG. 11, the user selects the donated items, but the retrieved tax deductible valuations will correspond with the last tax year for which item valuations have been provided. The dates of donations, items donated and the previous year's values for the donated items are stored within the software memory.

When the tax deductible valuations of items become available, the software can be updated. After the software is updated, the software is programmed to retrieve the items donated within the current tax year and their associated valuations. The current tax deductible valuations are used to replace the previous year's values. The current valuations for the donated items are then stored in association with the items donated and dates of donation. The upgrade feature allows the user to seamlessly make and track donations from year to year without interruption.

The software is programmed to update the prior information relating to that year. Thus, the valuations for all donations in year 2000 that had previously been entered will be updated without having to record and re-enter any other donation information. The software also can be updated when changes in the taxing authority guidelines occur. Taxing authority guidelines include laws, regulations, rules, guidelines or other mandates. For example, if the government were to change the income tax brackets for a certain income level from the 31% to 25%, the software could be updated to reflect such modifications. All of the information previously entered for that tax year would likewise be updated. In addition, the IRS might change the amount of deduction a user could take for a mileage donation. The update capability allows the user to keep track of the what was donated as well as the associated amount of donations within the software throughout the year.

The software of the present invention can be updated electronically by any method as is known in the art. A user can update the software through the use of a floppy disk or CD-ROM containing the update information. Alternatively, the software can be updated via a communications network such as the Internet. The updates can be inserted into the software on a periodic basis. If the software is located on a system server 32 and accessible over a communications network 28 as an application service provider as illustrated in FIG. 2, information will be updated regularly. The user would be able to see the resulting changes the next time the user logs on to the software. Preferably, the application service provider will provide the user a notice of the changes that were made and how the changes may affect the user.

The tax deductible valuations of donated items may be determined by aggregating sales data from a variety of sources. One method of aggregating sales data for the present invention uses data from Internet data partners such as on-line auction web sites and used goods retail sites. Each Internet data partner will have at least one server 33 for collecting data regarding sales information from their data source. The server 33 is programmed to monitor transactions between buyers and sellers and electronically store information on items that are sold. On a periodic basis the Internet data partners will provide data regarding auctions and sales of items over a specified period. The auction and sales data will include item descriptions, age of the item, condition of the item, date of the transaction, and the value of the transaction. As illustrated in FIG. 2, in the preferred embodiment, the partner servers 33 send the information via a communications network 28 to a system server 32. The system server 32 compiles all data received from various partner servers 33 and then calculates a tax deductible valuation of items in the specified period. These valuations can then be used to update the item valuation database for the specified period. In a preferred embodiment the period is one year, but any period acceptable under governmental tax regulations is acceptable. This data will provide an accurate tax deductible valuation for items that are charitably donated. The aggregation of actual sales prices provides a better estimate than aggregating information based on prices for which items are "on sale."

In a related embodiment, the system server 32 could also compile the sales data for other purposes including delivering a fair market valuation of a particular used good based upon the aggregation of the sales data. The fair market value could assist users who are purchasing or selling products. Preferably, the system server 32 maintains fair market valuations of used goods in the item valuation database and maintains the aggregated sales data in a sales history database. In a preferred embodiment, the system server 32 is programmed to provide the user with the ability to search the sales history database for a particular used good or to search the item valuation database to determine the fair market valuation of the particular item based upon the aggregate sales data of similar used goods.

In addition to collecting information from Internet web sites, sales data can be electronically collected directly from other data sources. For instance, a store that sells used goods could electronically collect sales data for items sold during a specific period. The information, such as the item description, date of transaction and value of the transaction when the item is sold, can be recorded at the time of sale. Preferably the information is entered at the point of sale or obtained through use of a UPC bar code having the sales data for the item stored on it. As the purchase is scanned the item description, sales price as well as purchase date is stored electronically on the store's server 33. As illustrated in FIG. 2, this data can be transmitted via a communications network 28 to the system server 32. Additionally, the data can be stored electronically on media such as a CD-ROM or floppy disk and periodically transported to the system server to be included with the item valuation database.

In a preferred embodiment of the software of the present invention, charities may be directly connected to the system server 32 and pass along charitable donation data for entry into the donation database. The charity will obtain information from the donor at the time the donor is making a charitable donation. The donation information is posted to the system server 32 to automatically create an entry for the contributing donor. The entry contains information relating to the charitable donation such as date, value, user information as well as specifics on what was donated. The system server 32 receives the donation information from the charity and creates an entry in the user's account for the date of the donation. This information is preferably transmitted across a communications network 28 to the system server 32. As illustrated in FIG. 2, the system server is also programmed to be an application service provider 22 accessible to the user via a communications network 28 to track the user's charitable donation information. This allows the user to conveniently make a donation and have all records of the transaction stored for later use in tax preparation or tracking charitable donations, without having to manually input the required information.

The software of the present invention also includes evaluation tools that convert the user's donation data into a visual display that is easy to read and analyze. Preferably the visual display is a graph, chart or table, more preferably a graph. The evaluation tools allow the user to make broad comparisons, such as a comparison of total charitable donations for the current year compared with last year. In addition, when the visual display is in graph format, the user can compare individual types of donations such as the amount of miles driven for charitable organizations for the month of June for the last four years. The visual display can also be used to summarize the previous year's donations. The user can choose to break out the giving into any desired sub-category such as donation type, specific date ranges or specific charities.

To use the evaluation tool, the user selects the variables to compare (e.g. non-cash item donations, financial securities donations, monetary donations, mileage, out-of-pocket expenses, charities or various subsets or combinations) then selects the time periods over which to make the comparison. The user can also select to print the resulting visual display.

In addition to recording and tracking charitable donations made during the course of one or more years, the software of the present invention may also be programmed to assist in the tax preparation process.

In a preferred embodiment, the software of the present invention is programmed to prepare a tax report containing the donation information required to fill out a tax return. The tax report can be displayed, printed, or electronically saved depending on the desired use. The printed tax report is preferably in a fixed format and contains summary and detail information for non-cash items, financial securities, monetary, mileage and out-of-pocket expense donations. In a most preferred embodiment, the printed report may include a code imprinted thereon that can be electronically read. The code contains all the charitable donation information needed to fill out a user's income tax return. Preferably, the code is a DATA-GLYPH™ or a bar code, readable by a corresponding code scanner.

The electronically saved tax report preferably comprises an export file containing year end tax summary and detail information pertaining to all deductible donations, including non-cash items, financial securities, monetary, mileage, and out-of-pocket expense charitable donation deductions. The export file may be tailored to fit a variety of tax preparation applications, wherein the format is based upon the user's selection from a list of tax preparation applications. As an example of the required formats for certain selected tax preparation applications, the export file could be ASCII, tab delineated, or ASCII fixed format. It is to be understood that the export file could be formatted to meet the specific requirements of any tax preparation application.

In the case of the user using a tax preparer to fill out the user's tax return, the export file may be electronically sent directly to the user's tax preparer via a communications network 28. Alternatively, the export file may be saved onto any computer readable medium such as a floppy disk or CD-ROM, or may be downloaded to a transportable computer device such as a hand-held computer for retrieval by the tax preparer.

If the donation tracking software used by the user is located on a stand alone PC of FIG. 1 and the user is preparing its tax return via the use of tax preparation software on the stand alone PC, during use of the tax preparation software the user is typically prompted to select a method of entering the user's charitable donation information. If the export file is located on the user's PC then the user can browse the PC hard drive to locate the created export file containing the year end charitable donations tax information. Once the file is selected, the tax preparation software imports the file to fill out Schedule A charitable donations totals and Form 8283 if required for non-cash item donations.

If the donation tracking software used by the user is located on a stand alone PC of FIG. 1 and the user is preparing its tax return via the use of tax preparation software offered by an application service provider on a communications network such as the Internet, during use of the tax preparation software the user is typically prompted to select a method of entering the user's charitable donation information. If the user is already connected to the communications network, the user can browse the PC hard drive to locate the created export file containing the year end charitable donations tax information. Once the file is selected, the tax preparation software imports the file via the communications network to fill out Schedule A charitable donations totals and Form 8283 if required for non-cash item donations.

If the user employs a communications network based application service provider for the user's donation tracking software and the user is preparing its tax return via the use of tax preparation software on a stand alone PC, the user is typically prompted to select a method of entering the user's charitable donation information. In order to retrieve the donation information the tax preparation software application may be programmed to prompt the user to supply identifying information. Preferably, the identifying information is a user name, password and tax year. The tax preparation application will send a request, including the identifying information, for the user's charitable donation data via the communications network to the system server of the appropriate application service provider. The system server will verify the identifying information and if correct, then the system server will create an export file for the requested tax year. The export file will be formatted corresponding with the requirements of the requesting tax preparation application. The charitable donation tracking software server will send the resulting data export file via a formatted transaction to the requesting tax preparation application. The tax preparation application will import the file via the communications network to fill out Schedule A charitable donation totals as well as Form 8283 if required for non-cash item donations.

If the user employs a communications network based application service provider for the user's donation tracking software and the user is preparing its tax return via the use of tax preparation software offered by an application service provider on a communications network such as the Internet, the user is typically prompted to select a method of entering the user's charitable donation information. In order to retrieve the donation information the tax preparation software application may be programmed to prompt the user to supply identifying information. Preferably, the identifying information is a user name, password and tax year. The tax preparation application will send a request, including the identifying information, for the user's charitable donation data via the communications network to the system server of the appropriate application service provider. The system server will verify the identifying information and if correct, then the system server will create an export file for the requested tax year. The export file will be formatted corresponding with the requirements of the requesting tax preparation application. The charitable donation tracking software server will send the resulting data export file via a formatted transaction to the requesting tax preparation application. The tax preparation application will import the file via the communications network to fill out Schedule A charitable donation totals as well as Form 8283 if required for non-cash item donations.

In addition to the graphical user interfaces presented to a user in FIGS. 3-23, the software of the present invention also can present advertisements or suggestions to encourage the user to utilize tax savings. The advertisements or suggestions can be stored in the software of the present invention or in a web-enabled environment. In the web-enabled environment, the advertisements or suggestions are retrieved from a separate database located at central site 26. The type of advertisements or suggestions presented to the user could be sponsorships from charitable organizations, non-profit organizations, or other types of businesses. Each of the organizations or businesses would present the user with ways in which tax savings may be utilized. When the user is presented with an advertisement or suggestion and decides to use any tax savings in a way advertised or suggested, the software will allow the user to make a donation or purchase directly to the organization or company administering the advertisement or suggestion via communications network 28.

The types of advertisements presented to the user are based on personal profile information about the user entered into the software of the present invention. The types of personal profile information collected by the software is related to web browsing patterns, purchasing information, donation habits, salary rate, and the rate in which the user is taxed. It should be understood that advertisements or suggestions do not have to be tailored to the user based on patterns or habits of the user. The advertisements or suggestions could be tailored to the user based on a category in which the user most likely falls. Factors for placing users in categories could include age, group, education level, income level, gender, geographic location, marital status, parental status, and the like.

Constructed and operated as previously described, the invention provides a system and method that is capable of associating a tax deductible valuation with an item donated based on a valuation methodology in accordance with guidelines set forth by the taxing authority such as determining a fair market value based on whether the condition of the item is in good, fair, or poor condition. In addition, the present invention encourages individuals to make donations by informing individuals of the substantial tax savings that can be realized by making charitable donations. Further, the present invention stores and calculates tax savings thereby eliminating the need for manual tabulation and monitoring of charitable donations.

From the foregoing, it will be seen that this invention is one well-adapted to attain the ends and objects hereinabove set forth together with other advantages which are obvious and inherent to the structure.

It will be understood that certain features and sub-combinations are of utility and may be employed without reference to other features and sub-combinations. This is contemplated by and within the scope of the claims.

Since many possible embodiments may be made of the invention without departing from the scope thereof, it is to be understood that all matter herein set forth or shown in accompanying drawings is to be interpreted as illustrative and not in a limiting sense.

What is claimed and desired to be secured by Letters Patent is as follows:

1. A system for determining a tax deductible value of charitable donations for income tax deduction purposes for one or more tax years, said system comprising:
    one or more partner servers having at least one data source where items are sold, wherein said partner servers are programmed to electronically capture sales data of items sold at said data source;
    a system server including a memory for storing said sales data, wherein said system server is programmed to:
        periodically receive said sales data from said partner server;
        store said sales data in said memory;
        identify one or more of said items sold that is similar to a donated item that a user has charitably donated; and
        calculate a tax deductible valuation for said donated item based on said sales data corresponding to said one or more of said items sold wherein when current tax year sales data are not available, a temporary estimate is calculated for the tax deductible value for said donated item using sales data from a previous tax year, and
        when the current tax year sales data becomes available, the tax deductible value for said donated item is updated to provide an accurate value.

2. The system of claim 1, wherein said sales data for each item includes an item description, date of sale and amount of sale.

3. The system of claim 1, wherein said data sources are Internet auction web sites.

4. The system of claim 1, wherein said data sources are retail shops that sell used goods.

5. The system of claim 1, wherein said sales data is electronically captured during sales transactions.

6. The system of claim 1, wherein said system server is accessible by said user via a communications network and further programmed to provide a search engine that allows said user to search said memory to locate said sales data corresponding to said donated item.

7. The system of claim 1, wherein said system server is further programmed to;
    prompt said user to select any of said items sold that is similar to said donated item, wherein said one or more of said items sold is identified based on a selection from said user;
    retrieve said tax deductible valuation for said donated item; and
    store said tax deductible valuation and said donated item in said memory in association with each other.

8. The system of claim 1, wherein said system server is further programmed to create an export file containing information pertaining to charitable donations for importing into an electronic tax preparation application.

9. A system for determining a tax deductible valuation of charitable donations of used items, the system comprising:
    a partner server configured to receive, over a communication network, from an on-line marketplace selling used items, sales data of the used items, said sales data comprising a sales price of an item and an item description; and
    a central server configured to:

determine a tax deductible valuation associated with said used items based on aggregate sales data of said used items, receive a user selection of a donated item and a tax year in which a donation of the donated item was made, retrieve a tax deductible valuation associated with said selected donated item for the tax year, and provide said tax deductible valuation associated with said selected donated item to an income tax preparation application wherein when current tax year sales data are not available, a temporary estimate is calculated for the tax deductible value for said donated item using sales data from a previous tax year, and when the current tax year sales data becomes available, the tax deductible value for said donated item is updated to provide an accurate value.

\* \* \* \* \*